(12) United States Patent
Takeuchi

(10) Patent No.: US 6,982,530 B2
(45) Date of Patent: Jan. 3, 2006

(54) DRIVE CONTROL SYSTEM

(75) Inventor: Kesatoshi Takeuchi, Nagano-ken (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/861,236

(22) Filed: Jun. 3, 2004

(65) Prior Publication Data

US 2005/0012475 A1   Jan. 20, 2005

(30) Foreign Application Priority Data

| Jun. 19, 2003 | (JP) | ............................... 2003-175454 |
| Dec. 3, 2003 | (JP) | ............................... 2003-404842 |
| Mar. 17, 2004 | (JP) | ............................... 2004-076410 |

(51) Int. Cl.
*F16D 3/00* (2006.01)

(52) U.S. Cl. ................. 318/34; 318/558; 310/156.36; 310/156.38

(58) Field of Classification Search ............... 318/34, 318/45, 558; 310/101, 114, 152, 156.01, 310/156.36, 156.37, 156.38, 261, 263
See application file for complete search history.

(56) References Cited

U.S. PATENT DOCUMENTS

| 2,885,873 | A | * | 5/1959 | Beeston, Jr. ................. 464/29 |
| 3,790,833 | A | * | 2/1974 | Hasebe ...................... 310/162 |
| 3,863,084 | A | * | 1/1975 | Hasebe ...................... 310/126 |
| 4,555,685 | A | | 11/1985 | Maruyama |
| 4,797,600 | A | * | 1/1989 | Savage et al. ............. 318/254 |
| 4,998,084 | A | | 3/1991 | Alff |
| 5,982,070 | A | | 11/1999 | Caamano |
| 6,776,002 | B1 | * | 8/2004 | Ho ............................. 62/401 |

FOREIGN PATENT DOCUMENTS

| JP | 10-80178 | 3/1998 |
| JP | 11-206077 | 7/1999 |

* cited by examiner

*Primary Examiner*—Bentsu Ro
(74) *Attorney, Agent, or Firm*—Harness, Dickey & Pierce, P.L.C.

(57) ABSTRACT

Provided is a drive system of a motor structured from a combined arrangement of a plurality of motors capable of reducing losses resulting from mechanical loss during the process of the driving force behind the motor being transmitted. This system has a plurality of motors mutually arranged adjacently, and a drive control unit of this motor, wherein the drive control unit drives the magnetic rotor by sending an excitation signal to at least one motor, and the magnetic rotors of the other motors are synchronously driven by the magnetic coupling with the magnetic field generated from the excitation driven magnetic rotor.

27 Claims, 22 Drawing Sheets

FIG.5
(1)
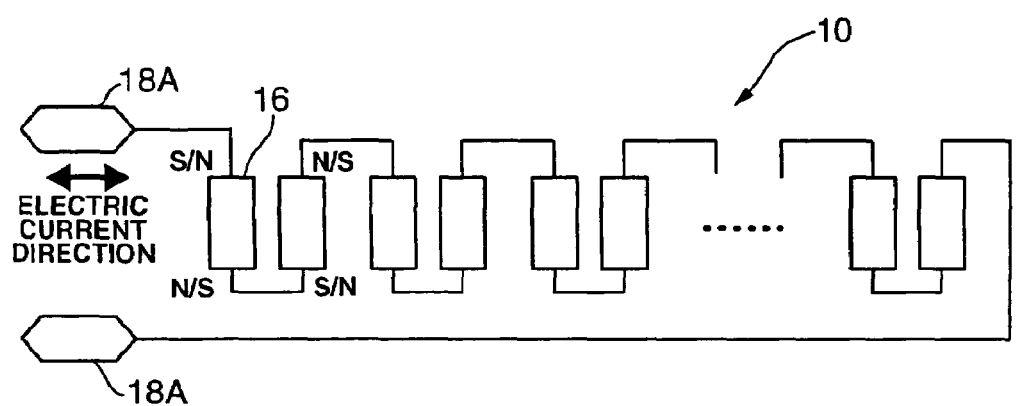
(2)
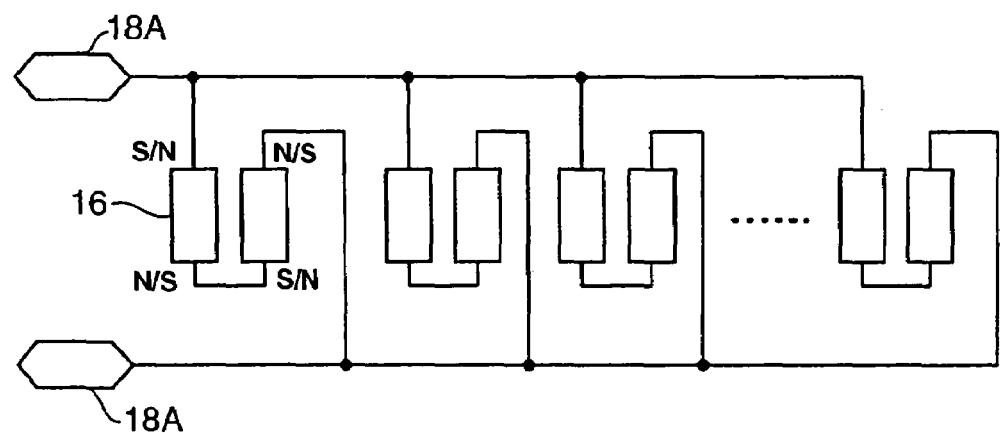

FIG.8
(1)
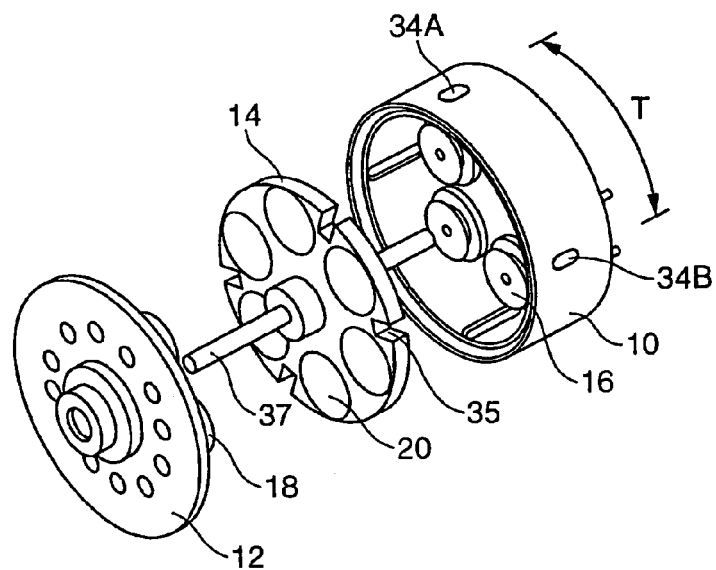
(2)
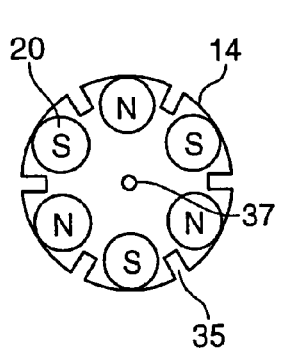
(4)
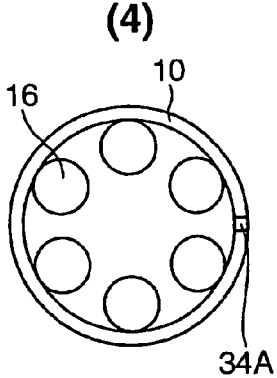
(5)
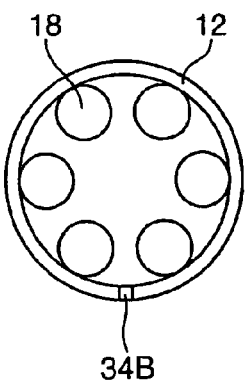
(3)
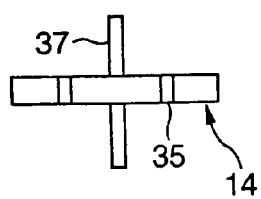

FIG.13
(1)
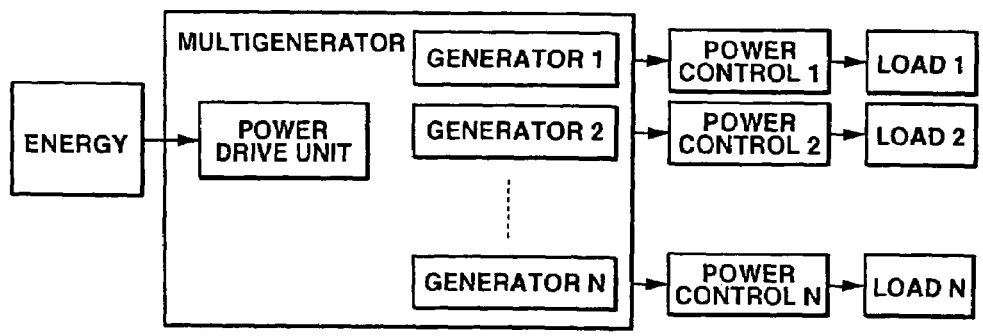
(2)
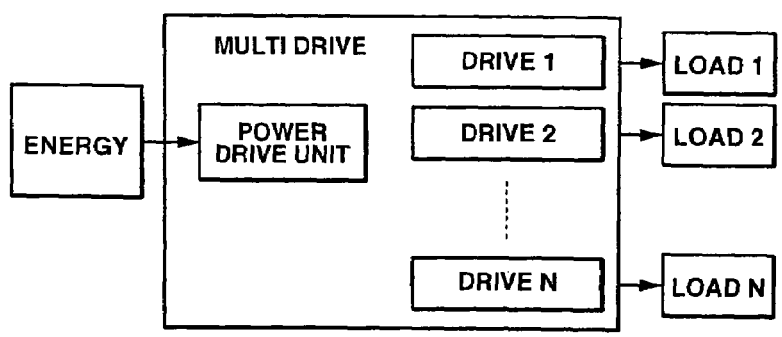
(3)
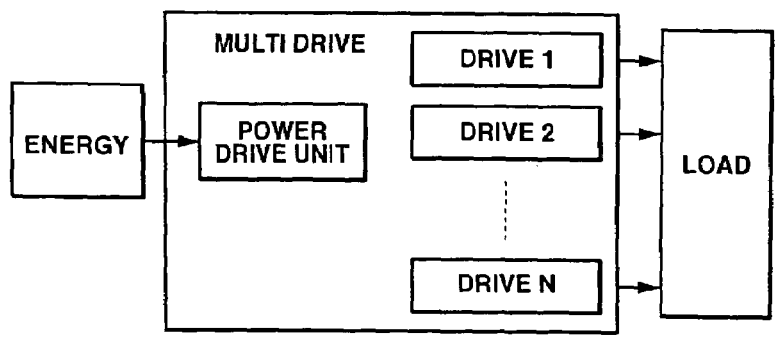

DRIVE CONTROL SYSTEM

TECHNICAL FIELD

The present invention pertains to an invention constituting an energy transmission mechanism by combining a plurality of magnetic drivers, and in particular to a system for driving a plurality of motors in combination, wherein the magnetic field generated from a certain motor is magnetically coupled with the magnetic rotors of other motors, and thereby enabling the synchronous rotation and drive of other magnetic motors without having to energize the other motors. The present invention may be applied to electric livingware, electric vehicles, electronic robot control, electronic toys, electric airplanes, self-generators, among others.

BACKGROUND ART

When driving a plurality of loads, the driving force from one motor is coupled with a plurality of loads via a gear transmission system. FIG. 17 is a diagram showing such a state, and the motor is driven with the accumulated energy. The motor drive is transmitted to the gear 1 so as to drive the load-1, the gear rotation is transmitted to the gear 2 so as to drive the load-2, and the rotation of gear N is transmitted to the gear N+1 so as to drive the load-N+1, in order.

Moreover, as a conventional example in relation to the present invention, there is the flat brushless DC motor described in Japanese Patent Laid-Open Publication No. H11-206077. According to this conventional example, a plurality of coils 36 is formed on at least one surface facing each of the rotary members 26 and 27 of the printed wiring board 25 through printed wiring. The coils 35 are successively energized, thus forming a rotary magnetic field which advances in the clockwise direction of the printed wiring board 25 and rotating the rotor 24 through the magnetic connection with the permanent magnet pieces 31 and 32.

DISCLOSURE OF THE INVENTION

Nevertheless, according to this drive system, loss will arise due to the mechanical loss during the transmission of the driving force of the motor. Thus, an object of the present invention is to provide a drive transmission control system formed by arranging a plurality of motors in combination and capable of reducing such a loss. Another object of the present invention is to provide a motor drive transmission control system capable of driving loads without much mechanical loss.

In order to achieve the foregoing objects, the present invention is a drive control system formed from a mechanism which arranges a plurality of magnetic bodies, and, when at least one magnetic body is driven, the drive thereof is sequentially transmitted to the other magnetic bodies without using a mechanical transmission mechanism; wherein the magnetic field generated from the drive of at least one magnetic body is magnetically coupled with the other magnetic bodies so as to synchronously drive the other magnetic bodies. Specifically, this system comprises a drive control unit formed from a plurality of motors mutually arranged adjacently, wherewith the motors are structured by the magnetic bodies comprising a magnetic rotor, and which is for exciting and driving at least one of the motors; wherein the drive control circuit is constituted so as to send a drive signal for driving the magnetic rotor to at least one of the motors; and the magnetic rotors of the other motors are synchronously driven by the magnetic coupling with the magnetic field generated from the excitation driven magnetic rotor.

According to this invention, since other subjects to be driven may be synchronously driven with the magnetic coupling from the magnetic field generated from an excitation driven subject, there is no need to use mechanical coupling during the transmission of the drive, and, as a result, an energy transmission system without any mechanical loss can be provided.

Moreover, the present invention is a drive control system in which provided is a sensor for detecting the change in intensity of the magnetic field of the driving magnetic bodies, and the output of the sensor is directly supplied as an exciting current to the magnetic coil of the other magnetic bodies. Specifically, in the other magnetic bodies, a plurality of electromagnetic coils is arranged as stators to the movable bodies in a non-contact manner in relation to the movable bodies to which a plurality of permanent magnets is sequentially arranged, and an exciting current is supplied to the electromagnetic coils so as cause the locomotion of the movable bodies through the attraction-repulsion between the movable bodies and electromagnetic coils. Further, the driving magnetic bodies are movable bodies, in particular rotors, formed by being connected to a drive source and to which a plurality of permanent magnets alternately magnetized to opposite poles is sequentially arranged.

According to the present invention, in addition to the other magnetic bodies being excited and driven with the magnetic coupling of the magnetic field generated from the driving magnetic bodies, when the sensor detects the change in a periodic magnetic field of the driving magnetic bodies, the periodic output of this sensor is supplied to the electromagnetic coils of the other magnetic bodies. As a result of directly supplying this sensor output to the electromagnetic coils of the other magnetic bodies, the movable bodies can be rotated further by the periodic attraction-repulsion between the other electromagnetic coils and movable bodies.

Further, the present invention is also a magnetic transmission system having a combination of a driver and load formed from a system to which a plurality of magnetic bodies is arranged, wherein a non-contact motion transmission is performed with magnetic coupling between at least one of the drivers and one of the loads, position detection means of magnetic bodies is provided to the load, and an electromagnetic coil for exciting the driver based on the detection results thereof is further provided.

BRIEF DESCRIPTION OF THE DRAWINGS

FIG. 5 is an equivalent circuit diagram showing the connected state of an electromagnetic coil;

FIG. 8(1) is a perspective view of a synchronous motor; FIG. 8(2) is a schematic plan view of the motor; FIG. 8(3) is a side view thereof; FIG. 8(4) is a diagram showing an A-phase electromagnetic coil (first magnetic member); and FIG. 8(5) is a diagram showing a B-phase electromagnetic coil (second magnetic member);

FIG. 13 is a block diagram of a drive system in such a motor arrangement;

BEST MODE FOR CARRYING OUT THE INVENTION

Figure 1:
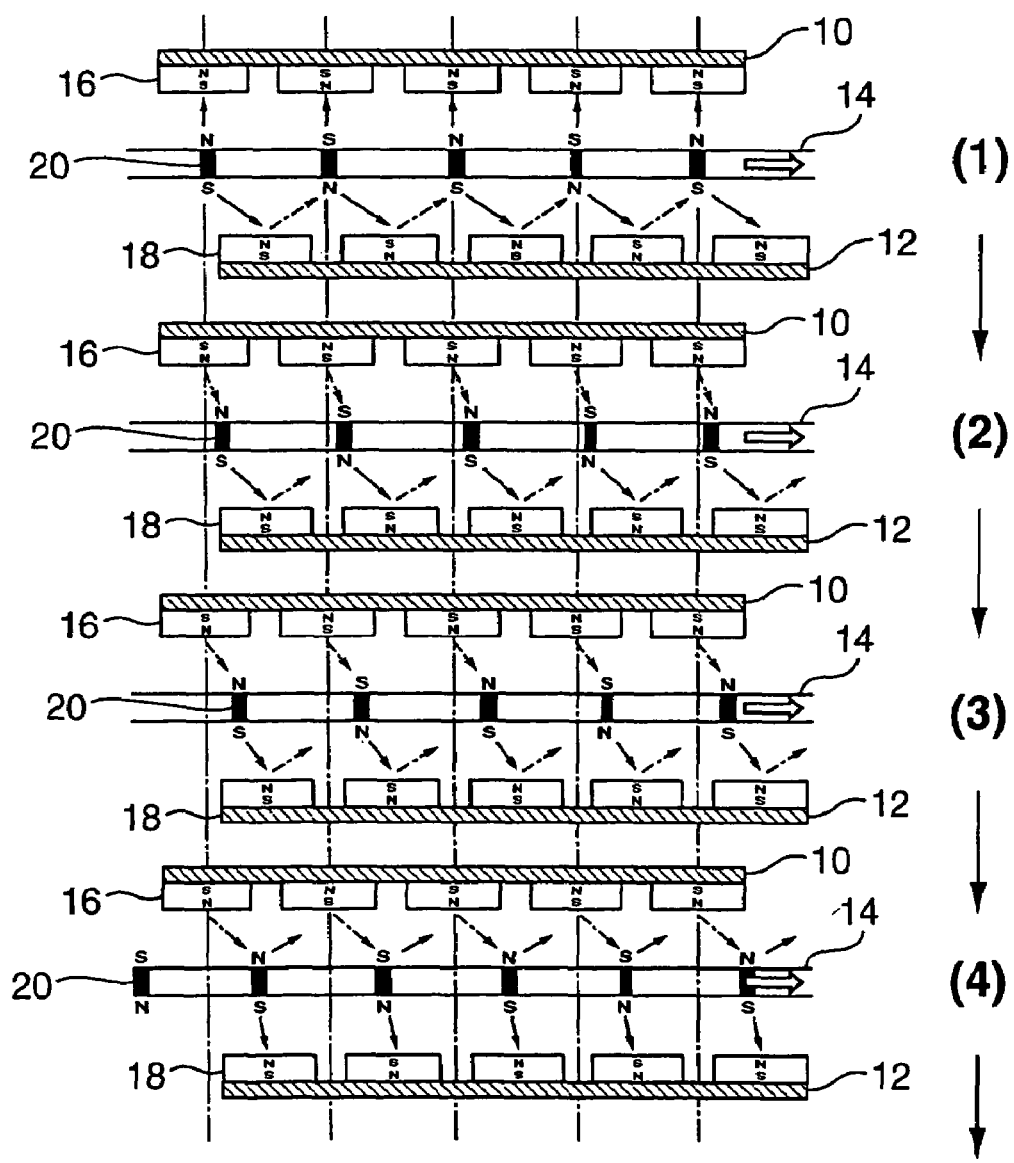
FIG. 1 is a view showing a frame format of a motor structure and the operational principle thereof.

FIG. 1 to FIG. 4 are views showing a frame format showing the operational principle of an excitation driven motor according to the present invention. This motor is structured from a first magnetic body (A-phase coil) 10 and a second magnetic body (B-phase coil) 12, and a third magnetic body 14 interposed therebetween.

These magnetic bodies may be structured in a circular shape (arc, circle) or in a linear shape. When forming the magnetic bodies in a circular shape, the third magnetic body, or either the first or second magnetic bodies functions as a rotor, and, when the magnetic bodies are formed in a linear shape, one of the magnetic bodies becomes a slider.

The first magnetic body 10 has a structure in which the coils 16 alternately excitable to the opposite poles are sequentially aligned in a prescribed spacing, preferably an even spacing. The equivalent circuit diagram of this first magnetic body is shown in FIG. 5. According to FIG. 1 to FIG. 4, as described above, all coils are excited to be constantly driven against the two-phase exciting coil during the start-up rotation (2π) with the foregoing polarity. Therefore, a drive means such as a rotor or slider may be rotated and driven at a high torque.

As shown in FIG. 5(1), a plurality of electromagnetic coils 16 (magnetic units) is serially connected in even spacing. Reference numeral 18A is an excitation circuit block for applying a frequency pulse signal to these magnetic coils. When an excitation signal for exciting the coils is sent from the excitation circuit to the electromagnetic coils 16, the respective coils are pre-set to be excited such that the direction of the magnetic poles will alternate between the adjacent coils. As shown in FIG. 5(2), the electromagnetic coils 16 may also be connected in parallel.

When a signal having a frequency for alternately switching in prescribed cycles the direction of the polarity of the supplied exciting current is applied from this excitation circuit (drive control circuit) 18A to the electromagnetic coils 16 of the first magnetic body 10, as shown in FIG. 1 to FIG. 4, a magnetic pattern which alternately changes the polarity on the side of the third magnetic body 14 from N pole→S pole→N pole is formed. When the frequency pulse signal becomes a negative polarity, a magnetic pattern is generated for alternately changing the polarity, which is on the third magnetic body side, of the first magnetic body. As a result, the excitation pattern appearing in the first magnetic body 10 will change periodically.

The structure of the second magnetic body 12 is similar to the first magnetic body 10, but differs in that the electromagnetic coils 18 of the second magnetic body are positionally out of alignment in relation to the electromagnetic coils 16 of the first magnetic body. In other words, as claimed in the appended claims, a prescribed pitch difference (angular difference) is provided to the coil array pitch of the first magnetic body and the coil array pitch of the second magnetic body. This pitch difference is preferably the distance in which the permanent magnet (third magnetic body) 14 moves in correspondence to one cycle (2π) of the exciting current frequency in relation to the coils 16, 18; that is, a distance corresponding to π/2, which is ¼ of the total distance of a pair of N pole and S pole.

The third magnetic body 14 is now explained. As shown in FIG. 1 to FIG. 4, this third magnetic body 14 is disposed between the first magnetic body and the second magnetic body, and a plurality of permanent magnets 20 (marked out in black) having alternately reverse polarities is aligned in a line (linearly or in an arc) in prescribed spacing, preferably in even spacing. An arc shape includes loops such as a perfect circle or an oval shape, as well as indefinite circular structures, half circles, fan shapes, and so on.

The first magnetic body 10 and the second magnetic body 12 are disposed in even spacing, in parallel for instance, and the third magnetic body 14 is disposed in the center of the first magnetic body and the second magnetic body. The array pitch of the respective permanent magnets in the third magnetic body is roughly the same as the array pitch of the magnetic coils in the first magnetic body 10 and the second magnetic body 12.

Next, the operation of the magnetic body structure in which the foregoing third magnetic body 14 is disposed between the first magnetic body 10 and the second magnetic body 12 is explained with reference to FIG. 1 to FIG. 4. As a result of the foregoing excitation circuit (reference numeral 18 in FIG. 5; to be explained in detail later), an excitation pattern as shown in FIG. 1(1) is generated to the electromagnetic coils 16, 18 of the first magnetic body and the second magnetic body.

Here, a magnetic pole in the pattern of →S→N→S→N→S→ is generated to the respective coils 16 on the surface facing the third magnetic body 14 side of the first magnetic body 10, and a magnetic pole in the pattern of →N→S→N→S→N→ is generated to the respective coils 18 on the surface facing the third magnetic body 14 side of the second magnetic body 12. In the diagrams, the arrows indicated with a solid line represent attraction, and the arrows indicated with a chain line represent repulsion.

The next instant, as shown in FIG. 1(2), when the polarity of the pulse wave applied to the first magnetic body via the drive circuit 18 (FIG. 5) is reversed, a repulsive force will arise between the magnetic pole generated to the coils 16 of the first magnetic body 10 and the magnetic pole of the permanent magnet 20 on the surface of the third magnetic body 14 illustrated in FIG. 1(1). Meanwhile, since an attracting force is generated between the magnetic pole generated to the coils 18 of the second magnetic body 12 and the magnetic pole on the surface of the permanent magnet of the third magnetic body 14, as shown in FIG. 1(1) to (5), the third magnetic body will sequentially move rightward in the diagram.

Figure 2:
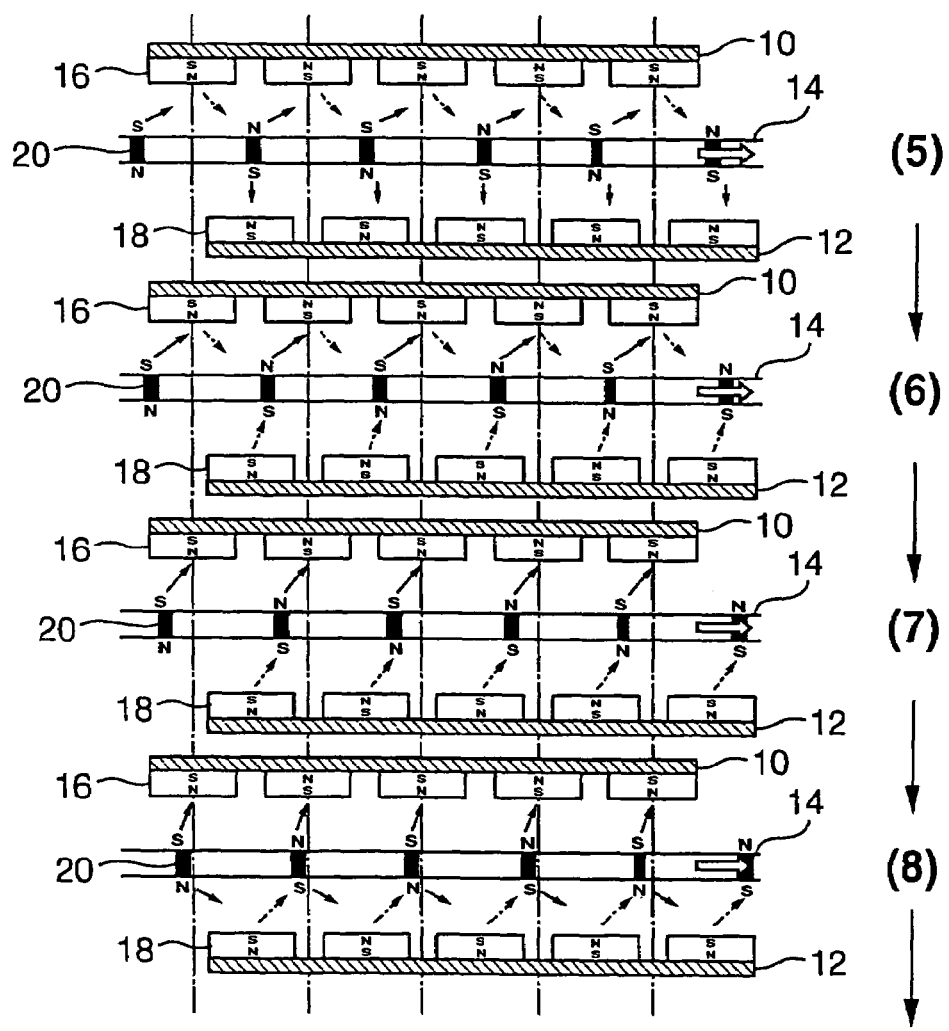
FIG. 2 is a diagram showing the operational principle subsequent to FIG. 1.
Figure 3:
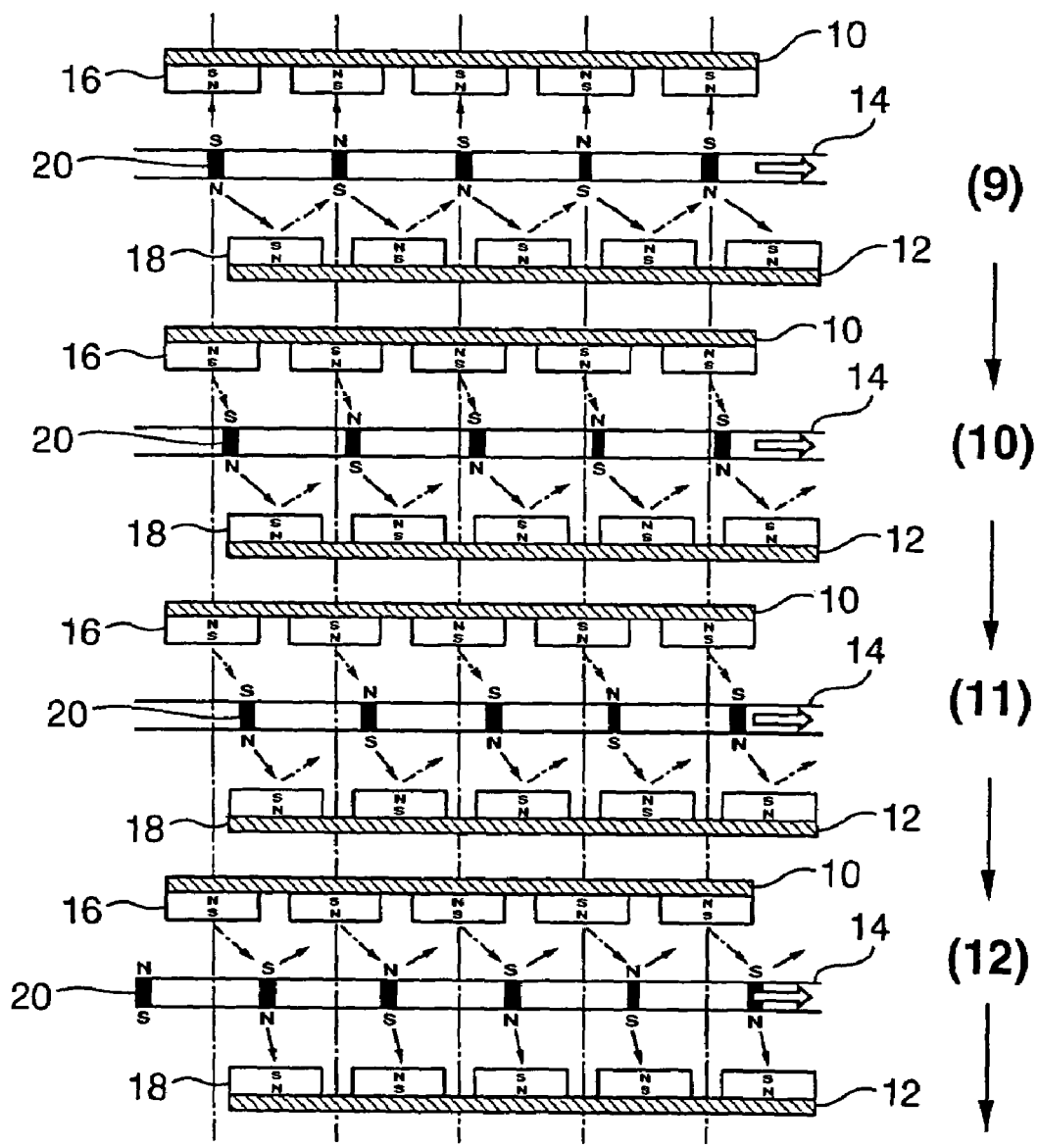
FIG. 3 is a diagram showing the operational principle subsequent to FIG. 2.
Figure 4:
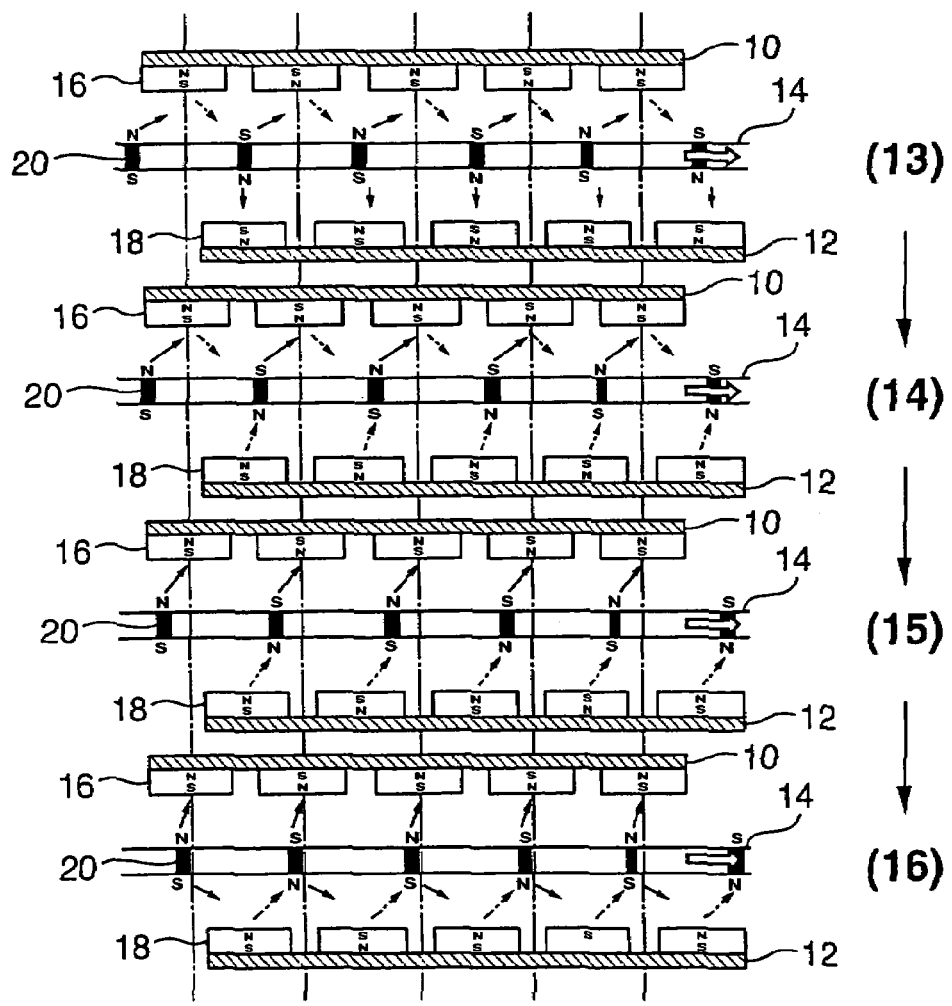
FIG. 4 is a diagram showing the operational principle subsequent to FIG. 3.

A pulse wave having a phase lag in comparison to the exciting current of the first magnetic body is applied to the coils 18 of the second magnetic body 12, and, as shown in FIG. 2(6) to (8), the magnetic pole of the coils 18 of the second magnetic body 12 and the magnetic pole on the surface of the permanent magnets 20 of the third magnetic body 14 repel against each other, and move the third magnet body 14 further rightward. FIG. 1(1) to FIG. 2(8) illustrate a case where the permanent magnets move a distance corresponding to π, and FIG. 3(9) to FIG. 4(16) illustrate a case where such permanent magnets move a distance corresponding to the remaining π. In other words, the third magnetic body relatively moves, in relation to the first and second magnetic bodies, a distance corresponding to one cycle (2π) of the frequency signal supplied to the electromagnetic coils 16, 18 in FIG. 1(1) to FIG. 4(16).

As described above, by respectively supplying a frequency signal having mutually different phases to the first magnetic body (A-phase) and the second magnetic body (B-phase), the third magnetic body 14 can be moved linearly, or the third magnetic body 14 may be rotated as a rotor.

When the first magnetic body, second magnetic body and third magnetic body are formed in an arc, the magnetic structure depicted in FIG. 1 will become a structure of a rotating rotor, and, when these magnetic bodies are formed linearly, the magnetic structure thereof will become a linear motor. In other words, a rotating driver such as a motor can be realized with the structure of these magnetic bodies.

According to this magnetic structure, since the third magnetic structure is able to move upon being subject to the magnetic force from the first magnetic body and the second magnetic body, the torque upon moving the third magnetic body will increase, and, since the torque/weight balance will become superior, a small motor capable of driving at a high torque can be provided thereby.

Figure 6:
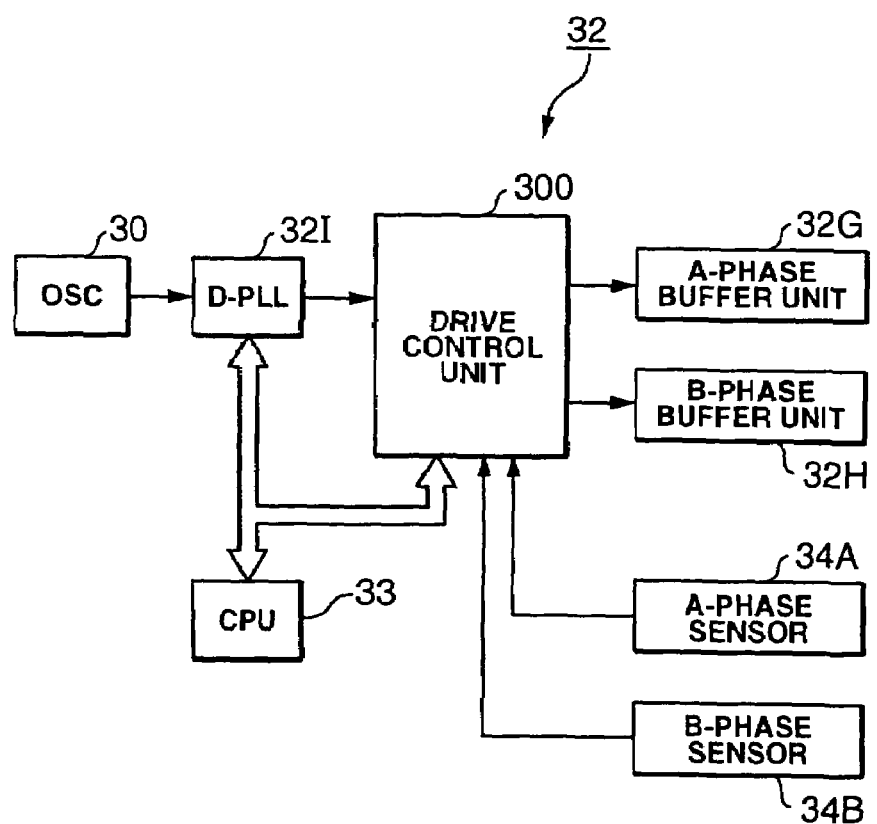
FIG. 6 is a block diagram of the drive unit of a motor.

FIG. 6 is a block diagram showing an example of an excitation circuit (drive control circuit) for applying an exciting current to the electromagnetic coils (A-phase electromagnetic coils) 16 of the first magnetic body and the electromagnetic coils (B-phase electromagnetic coils) of the second magnetic body.

This excitation circuit is structured to respectively supply controlled pulse frequency signals to the A-phase electromagnetic coils 16 and the B-phase electromagnetic coils 18.

Reference numeral 30 is a quartz oscillator, and reference numeral 32I is a D-PLL circuit for generating a reference pulse signal by M-dividing this oscillation frequency signal.

Reference numeral 34 is a sensor for generating a position detection signal corresponding to the rotational speed of the third magnetic body (a rotor in this case) 14. This sensor is preferably a Hall sensor (magnetic sensor) or an optical sensor. Halls in the number corresponding to the number of permanent magnets are formed in the magnetic rotor, and, when these Halls correspond to the sensor, the sensor generates a pulse each time it passes by the location of the Halls. Reference numeral 34A is an A-phase side sensor for supplying a detection signal to the driver circuit of the A-phase electromagnetic coil, and reference numeral 34B is a B-phase side sensor for supplying a detection signal to the driver circuit of the B-phase electromagnetic coil.

The pulse signals from these sensors 34A, 34B are respectively output to the driver 32 for supplying an exciting current to the first and second magnetic bodies. Reference numeral 33 is a CPU and outputs a prescribed control signal to the D-PLL circuit 32I and the driver 32. Reference numeral 32G is an A-phase buffer for outputting an excitation signal to the A-phase coil, and reference numeral 32H is a B-phase buffer for outputting an excitation signal to the B-phase coil.

Figure 7:
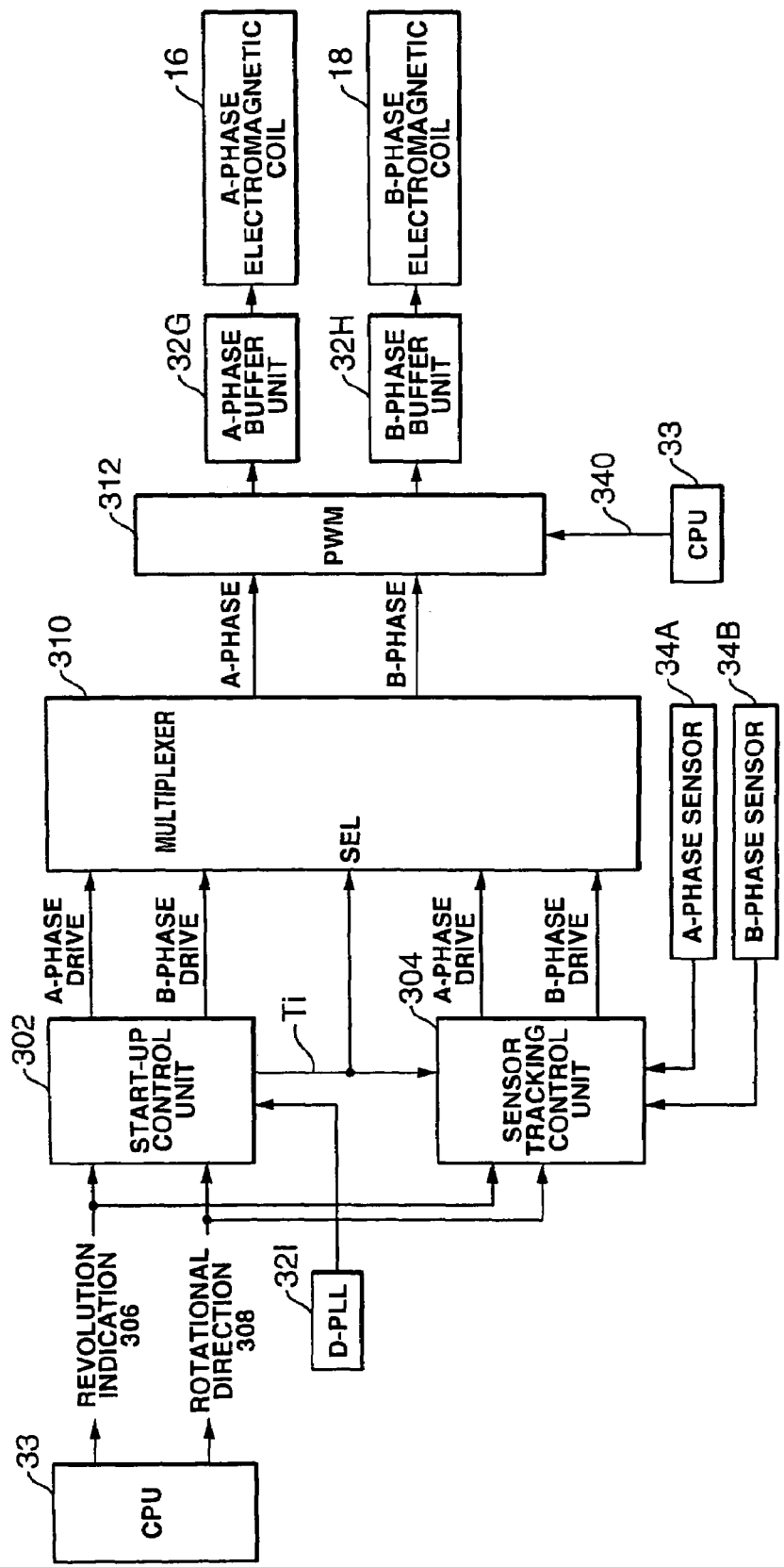
FIG. 7 is a detailed block diagram thereof.

As shown in FIG. 7, this drive control unit is structured from an A-phase coil/B-phase coil start-up control unit 302, and a sensor tracking control unit 304. The start-up control unit is for controlling the start-up of the motor, and the sensor tracking control unit makes the signal waves supplied to the respective phase coils track, and synchronize with, the detected pulse from the respective phase sensors by returning such detected pulse without having to supply a reference wave to the buffer unit after the start-up of the motor. The frequency from the quartz oscillator 30 is divided by the D-PLL 32I, and this is then supplied to the drive control unit 300.

In FIG. 7, the rotation start/stop indication 306 and rotation direction indication 308 from the CPU 33 are input to the start-up control unit 302 and the sensor tracking control unit 304. Reference numeral 310 is a multiplexer which switches the control output from the start-up control unit and the output from the sensor tracking control unit. Output (reference wave) from the D-PLL 32I is supplied to the start-up control unit 302. A switching command value for switching the output from the start-up control unit 302 and the output (A-phase drive, B-phase drive) from the sensor tracking control unit 304 is output from the start-up control unit 302 to the input terminal SEL of the multiplexer 310. The start-up control unit 302 outputs to the multiplexer 310 and the sensor tracking control unit 304 an output Ti for converting the control mode, after the start-up, from the start-up control phase to the sensor tracking control phase.

Reference numeral 312 is a PWM control unit, and the duty ratio of the drive signal supplied to the respective phase coils is changed based on the duty ratio command value 340 from the CPU 33.

FIG. 8 is a diagram embodying the magnetic bodies pertaining to the present invention as a synchronous motor, wherein FIG. 8(1) is a perspective view of a synchronous motor; FIG. 8(2) is a schematic plan view of the motor (third magnetic body); FIG. 8(3) is a side view thereof; FIG. 8(4) is a diagram showing an A-phase electromagnetic coil (first magnetic member); and FIG. 8(5) is a diagram showing a B-phase electromagnetic coil (second magnetic member).

The reference numerals used in FIG. 8 are the same as the structural components corresponding to the foregoing diagrams.

The motor comprises a pair of A-phase magnetic body 10 and B-phase magnetic body 12 corresponding to a stator, as well as the third magnetic body 14 constituting the [rotor] described above, and a cylindrical rotor (third magnetic body) 14 is rotatably disposed around the axis 37 and between the A-phase magnetic body and B-phase magnetic body. The rotating axis 37 is fitted into an opening in the center of the rotor such that the rotor and rotating axis can rotate integrally. As shown in FIGS. 8(2), (4) and (5), six permanent magnets are provided to the rotor in even spacing around the circumferential direction thereof, polarities of the permanent magnets are made to be mutually opposite, and six electromagnetic coils are provided to the stator in even spacing around the circumferential direction thereof.

The A-phase sensor 34A and B-phase sensor 34B are provided to the inner side wall of the case of the A-phase magnetic body (first magnetic body) via a specific distance T (distance corresponding to $\pi/2$). A value corresponding to a value for providing a prescribed phase difference to the frequency signal supplied to the A-phase coils 16 and the frequency signal supplied to the B-phase coils 18 is used for the distance between the A-phase sensor 34A and B-phase sensor 34B.

As described above, a plurality of holes 35 (e.g., same number of holes as the number of permanent magnets disposed evenly in the circumferential direction of the rotor; 6 holes in this embodiment) is formed at the edge in the circumferential direction of the rotor. The sensor is formed from a light emitting unit and a light receiving unit. These holes are formed from a member that constantly reflects the infrared light from the light receiving unit of the sensor and absorbs such infrared light upon detecting the position. The main body of the rotor is formed from an insulator or a conductor.

Here, the A-phase/B-phase sensors generate a pulse each time the hole 35 passes by the sensors while the rotor 14 is rotating. In other words, a groove or light-absorbing material for absorbing light is provided to the holes 35, and, each time a hole passes by the sensors, the light receiving unit of the sensors will not receive the light emitted from the light emitting unit. Therefore, the sensors generate a pulse signal in a prescribed frequency in accordance with the rotational speed of the rotor and the number of holes.

Figure 9:
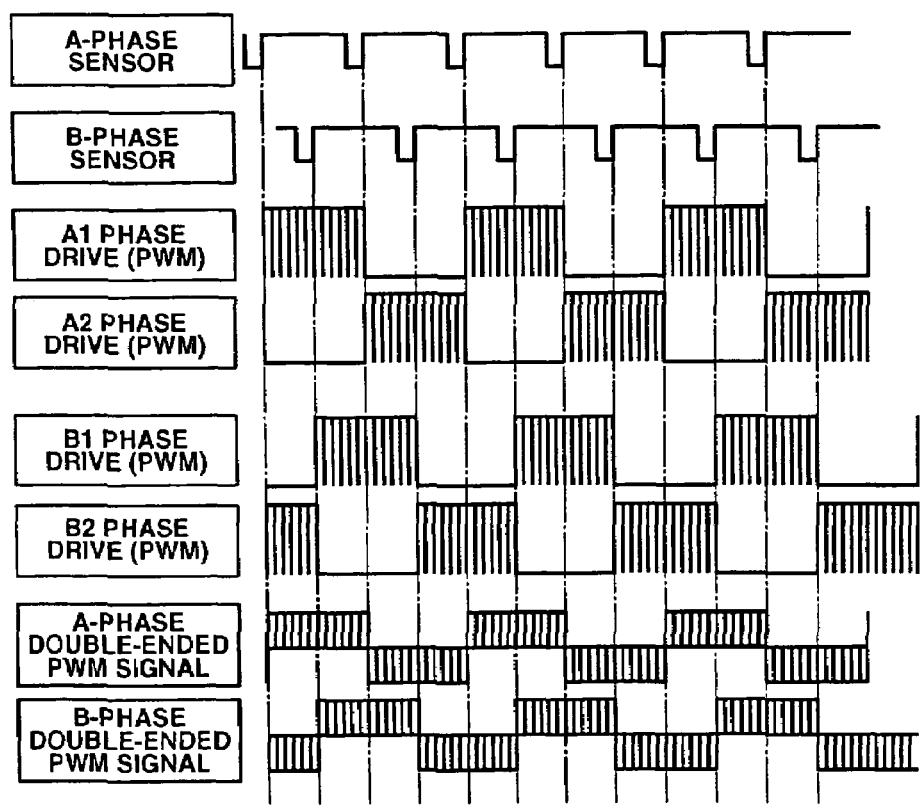
FIG. 9 is a characteristic diagram of a PWM control waveform of the exciting current to be output to the coil.

FIG. 9 is a characteristic diagram of the duty ratio-controlled waveform, and the duty ratio of the H period in the respective drive outputs of the A phase and B phase is changed under the control of the CPU. For instance, the duty ratio is set to 100% when the maximum torque of the motor (load) is required (at the time of start-up, acceleration, and increase or variation in the load), and, in other cases; for example, during a constant-velocity drive of the motor or a low load, the duty may be lowered. The CPU seeks the load variance of the motor by measuring the sensor output from the A-phase magnetic body and B-phase magnetic body, and determines a prescribed duty ratio from a table set and stored in the memory.

Figure 10:
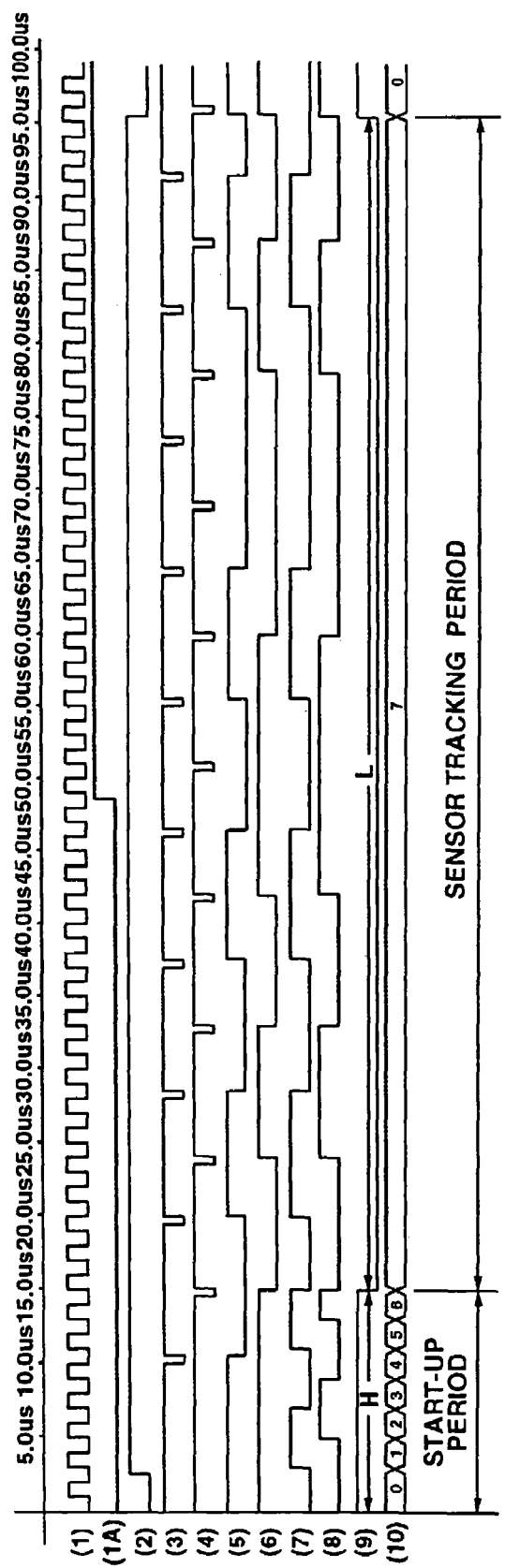
FIG. 10 is a diagram showing the waveform characteristics according to the block diagram illustrated in FIG. 27.

FIG. 10 is a waveform diagram of the circuit illustrated in FIG. 7, and FIG. 10(1) is a D-PLL pulse wave, FIG. 10(2) is a motor start flag, FIG. 10(3) is an A-phase sensor output, FIG. 10(4) is a B-phase sensor output, FIG. 10(5) is a flip-flop output that is output based on the A-phase sensor output, FIG. 10(6) is a flip-flop output that is output based on the B-phase sensor output, FIG. 10(7) is an output pulse waveform to the A-phase coil, FIG. 10(8) is an output pulse waveform to the B-phase coil, FIG. 10(9) is the start-up period of the motor, FIG. 10(10) shows the count value of a counter corresponding to the start-up period, and FIG. 10(1A) is the normal rotation/reverse rotation flag of the motor. The multiplexer 310 according to FIG. 7 outputs to the PWM control unit 312 an output form the start-up control unit 302 during the "H" period (start-up period) and outputs to the PWM control unit 312 an output from the sensor tracking control unit during the "L" period (sensor tracking period) shown in FIG. 10(9). The switching of these outputs is shown in FIGS. 10(7) and (8).

Here, when the rotational direction and revolution indication are output from the CPU to the start-up control unit 302 and the sensor tracking control unit 304, the start-up control unit will raise a flag inside the memory indicating that it is the start-up period (c.f. FIG. 10(9)). The start-up control unit 302 counts the pulse wave of the D-PLL 32I for $2\pi$ (e.g., for a total of seven pulses). During this period (FIG. 10(10)), without having to track the output from the sensor, as shown in FIGS. 10(7) and (8), the start-up control unit creates a drive signal to the respective A-phase and B-phase coils with the frequency from the D-PLL, and outputs this to the respective phase coils to start the motor. The start-up control unit resets the foregoing start-up flag when the start-up period is complete.

After the start-up period is complete, the sensor tracking control unit 304 generates a drive signal from the output of the respective phase sensors (FIGS. 10(3), (4)) to the respective phase coils via the flip-flop (FIGS. 10(5), (6)). During the sensor tracking period after the completion of the start-up, the sensor tracking control unit 304 does not use the D-PLL output for generating the drive signal to the respective phase coils. After the completion of the start-up period, the CPU outputs to the multiplexer 310 a switching command for the sensor tracking control. The multiplexer switches the output from the start-up control unit to the output from the sensor tracking control unit, and outputs this to the PWM control unit 312. At the PWM control unit, the duty ratio of the drive output to the respective phase coils is sent to the buffer circuits 32G, 32H of the respective phase coils after being changed and adjusted, or controlled. During a low rotation, rotation speed control changing the D-PLL frequency only during the start-up period may be employed without using the respective phase sensors.

During the reverse rotation of the motor, when a reverse rotation command is given from the CPU to the start-up control unit or the sensor tracking control unit, a reverse rotation flag will be raised (FIG. 10(1A)), and, after setting this flag, the sensor tracking control unit 304 once masks the output of the B-phase sensor in the rotational direction displacement period (350 in FIG. 30), and, during the period of such masking, switches the polarity of the normal rotation excitation signal of the B-phase coil to the become a B-phase (reverse) polarity. As a result, behavior of the normal rotation to the reverse rotation of the motor will become smooth, and, by setting a reverse rotation flag during a normal rotation, a braking effect against the normal rotation is enabled.

According to the embodiment described above, after the start-up of the motor, the drive control unit forms an excitation signal to the A-phase magnetic body and B-phase magnetic body by making it track the sensor output. Thus, it is possible to supply an excitation signal corresponding accurately to the load fluctuation in the motor to the magnetic bodies of the respective phases. Further, when not much torque is required for the motor, either the A-phase or B-phase may be stopped after realizing a steady rotation. In such a case, the magnetic body of the phase in which the excitation signal was stopped may be used as a generator means or braking control means.

Figure 11:
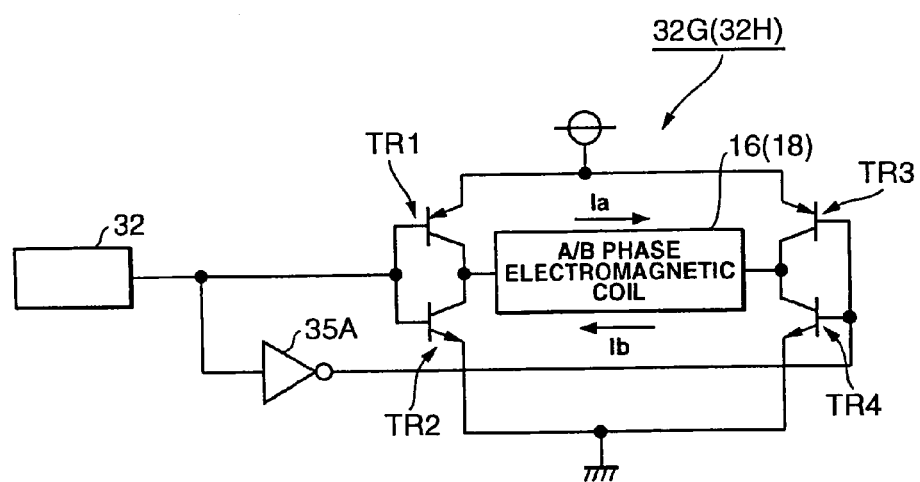
FIG. 11 is a detailed diagram of an A-phase/B-phase buffer circuit.

FIG. 11 is a detailed diagram showing the A-phase and B-phase buffer circuits (32G, 32H). This circuit includes switching transistors TR1 to TR4 upon applying an exciting current formed from a pulse wave to the A-phase electromagnetic coil or the B-phase electromagnetic coil, and further includes an inverter 35A. Here, when "H" as the signal is applied to the buffer circuit, TR1 is turned off, TR2 is turned on, TR3 is turned on, TR4 is turned off, and an exciting current in the direction of Ib is applied to the coil. Meanwhile, when "L" as the signal is applied to the buffer circuit, TR1 is turned on, TR2 is turned off, TR3 is turned off, TR4 is turned on, and an exciting current in the direction of Ia, which is the opposite of Ib, is applied to the coil. Therefore, the respective excitation patterns of the A-phase electromagnetic coil and B-phase electromagnetic coil may be alternately changed. This is as per the explanation of FIG. 1 above. Nevertheless, when exciting the A/B phases, the transistors TR1 to TR4 may be turned off, and, therefore, this is not limited to the case depicted in FIG. 11.

Figure 12:
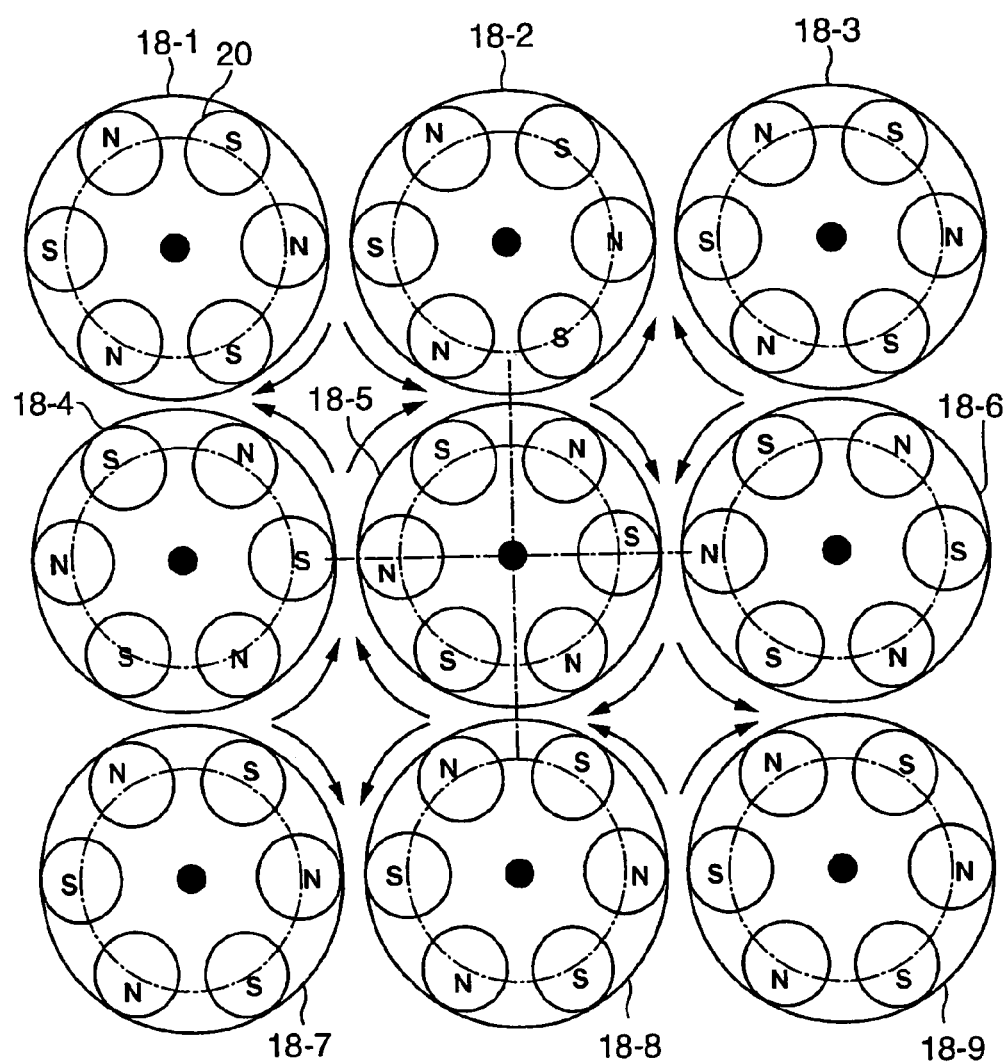
FIG. 12 is a block diagram showing a structure in which an excitation drive-side motor and a synchronous drive-side motor are arranged in parallel in the horizontal direction.

FIG. 12 is a block diagram of the drive system in which a plurality of motors is arranged (deployed) in the horizontal direction. The magnetic rotors 18-1 to 18-9 of the motor are respectively structured from the rotor illustrated in FIG. 8, but only the center rotor 18-5 is connected to the drive control means (circuit) 300 and corresponds to a driver. The other rotors are not connected to the drive power source, and are synchronously driven loads. In other words, the center rotor 18-5 is rotationally driven via excitation with the drive circuit, and the peripheral rotors thereof are synchronously rotated by being magnetically coupled (non-contact transmission drive) with the rotating magnetic field generated upon the rotor 18-5 being rotated. Rotors (18-1 to 18-4, 18-6 to 18-9) excluding the drive motor (18-5) may also be structured to merely be magnetic rotors on the load side.

The A-phase coil and B-phase coil of the motor on the synchronous drive side do not have to be connected to the drive control circuit, and may be connected to a generator means as necessary. Or, the respective phase coils of all motors may be connected to the drive control means, and by turning on/off the drive control means of the respective motors as necessary, the excitation drive-side motor and synchronous drive-side motor may be selected as necessary. A load may also be connected to the respective motors. The load fluctuation of the respective motors may be detected as an output variation of the position sensor described above.

When the excitation drive-side motor in the center is rotated in the direction of the arrows, the synchronous drive-side motors will respectively rotate in the direction of the arrows. When the synchronous drive-side motor rotates, adjacent synchronous drive-side motors will also rotate due to magnetic coupling. Here, there is no energy loss based on the mechanical loss during the transmission of driving force between the respective rotors.

FIG. 13 shows several examples of a functional block diagram of the system in which a plurality of magnetic rotors is arranged in parallel. In FIG. 13(1), power (energy) from the drive source is supplied to the excitation drive-side motor. Coils of the respective synchronous drive-side motors are respectively connected to generators 1, 2 . . . N. The respective generators are respectively connected to loads 1, 2 . . . N via the power control blocks 1, 2 . . . N. The block diagram of FIG. 13(2) differs from the block diagram of FIG. 13(1) in that loads are respectively connected to the synchronous drive-side motors. The block diagram of FIG. 13(3) differs from the block diagram of FIG. 13(1) in that a common load is driven with the synchronous drive-side motors.

Figure 14:
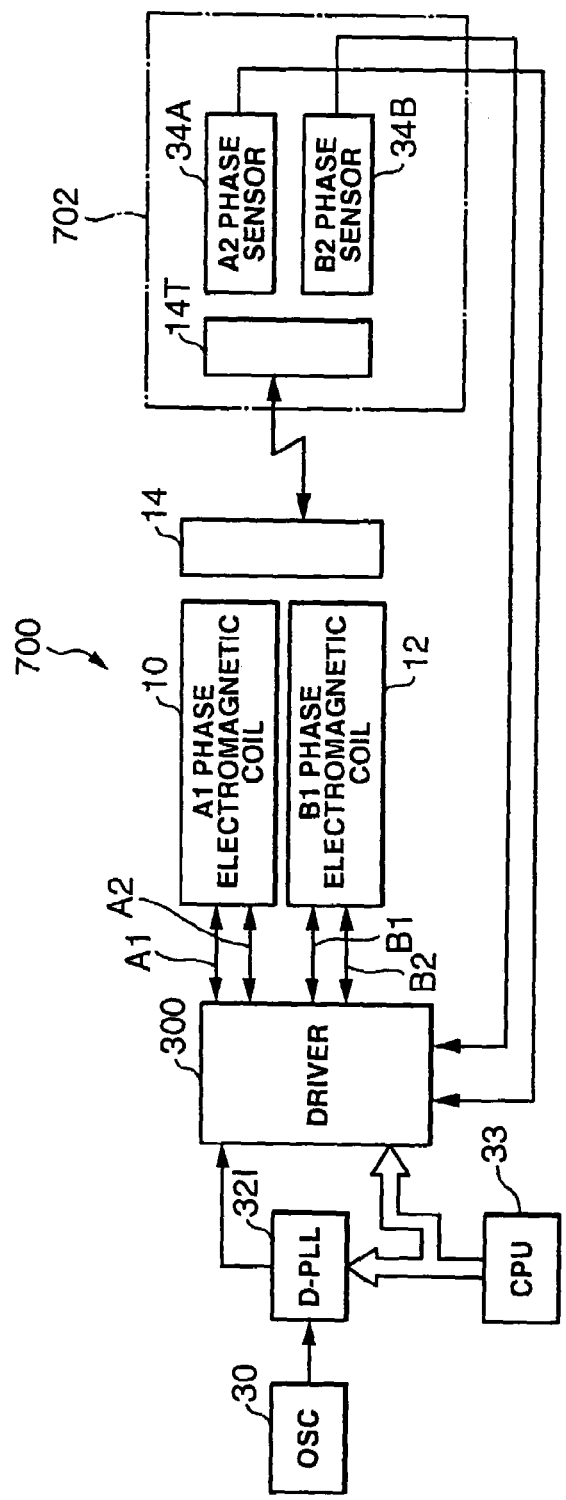
FIG. 14 is a functional block diagram in which a sensor output of the synchronous drive-side motor is returned to the driver of the excitation drive-side motor.

FIG. 14 pertains to another embodiment, and the signal from the rotational position sensors 34A, 34B of the synchronous drive-side motor 702 is returned to the driver 300 of the excitation drive-side motor 700. As shown in FIG. 6, by the phase information on the rotational position of the magnetic rotor 14T of the synchronous drive-side motor being returned to the exciting drive-side driver 300, the driver of the excitation drive-side motor 700 will control the rotational status of the magnetic rotor 14 of the excitation drive-side motor. Through magnetic coupling with the rotating magnetic field generated from the rotation of this controlled magnetic rotor, the magnetic rotor 14T of the synchronous drive-side motor will rotate, and the rotation thereof can also be controlled. Arrows in the diagram represent such magnetic coupling.

Figure 15:
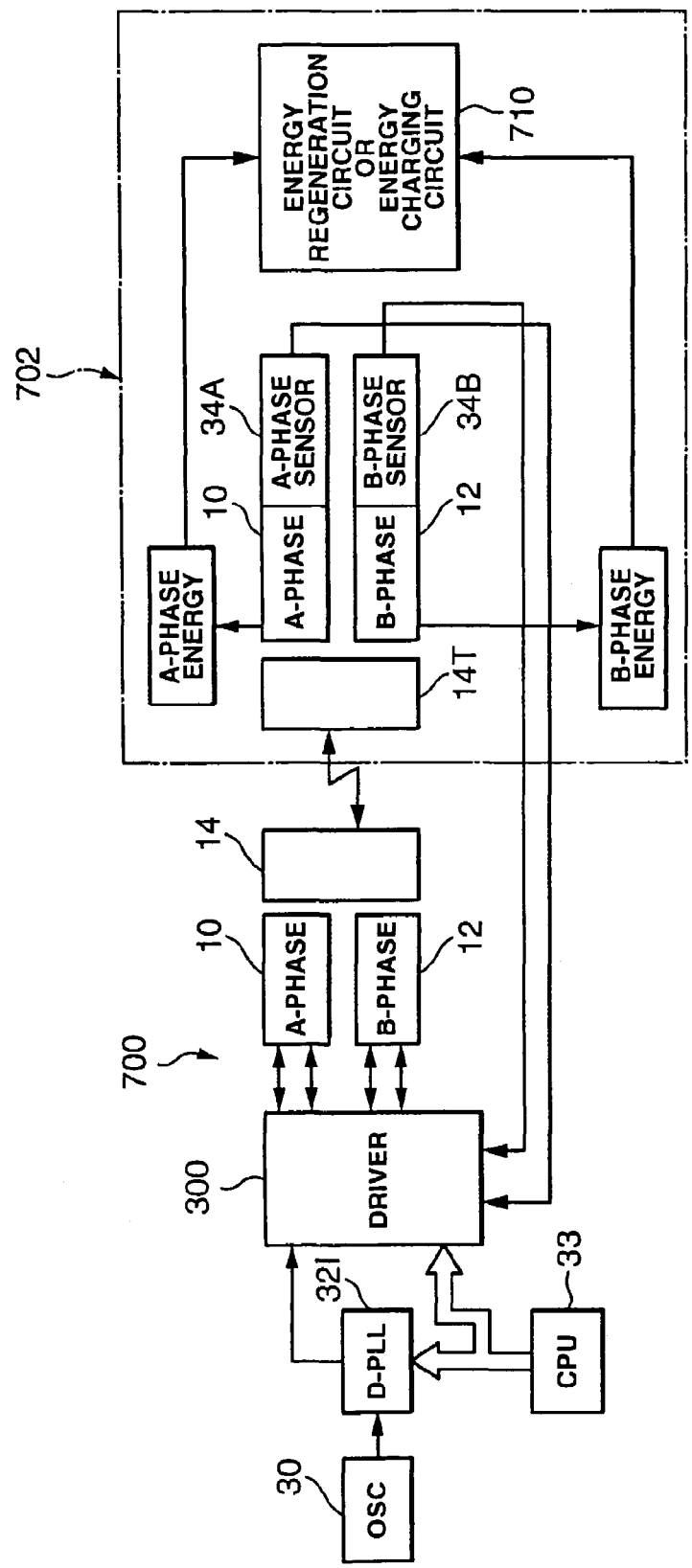
FIG. 15 is a functional block diagram in which the energy output from the coil of such a synchronous drive-side motor is connected to a charge control circuit.

FIG. 15 pertains to yet another embodiment, and, as a result of the A-phase coil 16 and B-phase coil 18 of the synchronous drive-side motor being connected to the charging circuit (energy regeneration circuit) 710, the magnetic rotor 14T of the synchronous drive-side motor is synchronously driven, and the energy generated in the respective phases may be accumulated in the accumulating means in such a charging circuit. Further, it is also possible to perform the rotation control of the synchronous drive motor by controlling the A-phase energy and B-phase energy.

Figure 16:
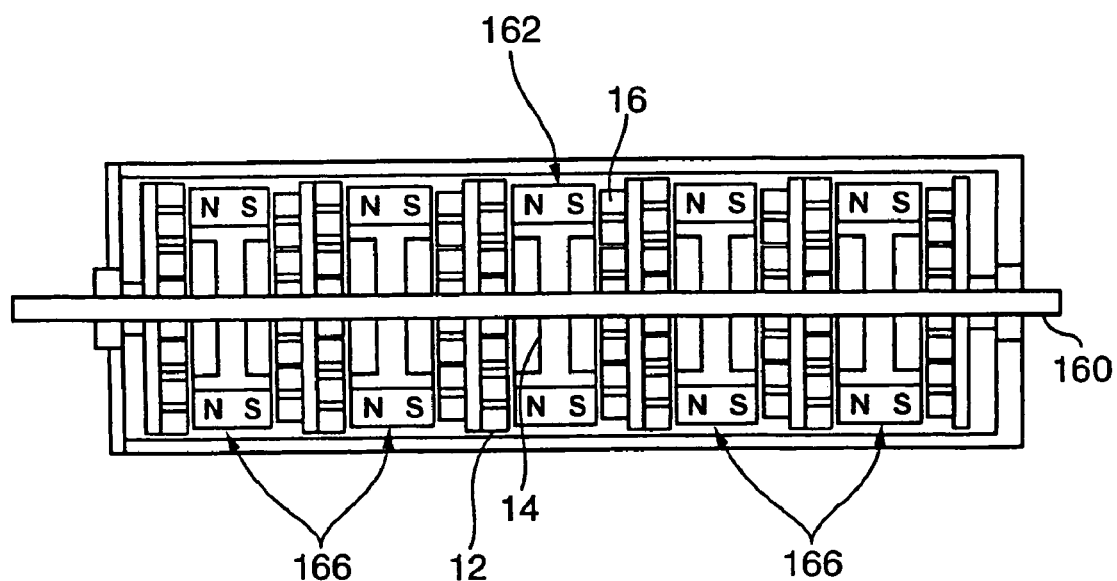
FIG. 16 is a diagram showing a structural example in which the excitation drive-side motor and the synchronous drive-side motor are overlapped and arranged in the linear direction.
Figure 17:
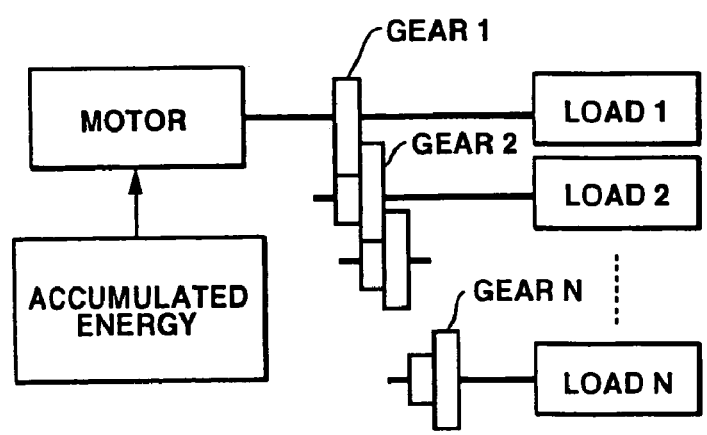
FIG. 17 is a block diagram showing a load drive system employing a conventional motor.

FIG. 16 is a diagram showing a case where a plurality of motors is overlapped in a perpendicular direction (serial direction), and a common axis 160 is rotated with the magnetic rotors (permanent magnets) of the respective motors. The motor 162 in the center is on the exciting drive side, and excitation electric signals are respectively output to the A-phase coil 16 and B-phase coil 18. The other motors 166 are on the synchronous drive side, and the respective A-phase coils and B-phase coils are connected to the power generation/charge control circuit.

Here, when the magnetic rotor of the excitation drive-side motor 162 rotates, the magnetic rotor 166 of the synchronous drive-side motor will gnathonically rotate due to magnetic coupling. As a result, all motors will be used to rotate the axis 160. When decelerating the rotational speed of the axis, this may be realized with power braking by connecting the synchronous drive-side motor to the power generation/charge control circuit. Further, a plurality of independent power generation sources may also be easily realized.

Incidentally, the excitation drive-side motor and the synchronous drive-side motor may also be rotated at the same speed through phase synchronization of the drive signal to the excitation drive-side motor and the output of the rotational position sensor of the synchronous drive-side motor via PLL control. Other than when increasing the torque, coils of the synchronous drive-side motors may be connected to the power generation circuit. The axis rotated with the motors is common to all motors.

Figure 18:
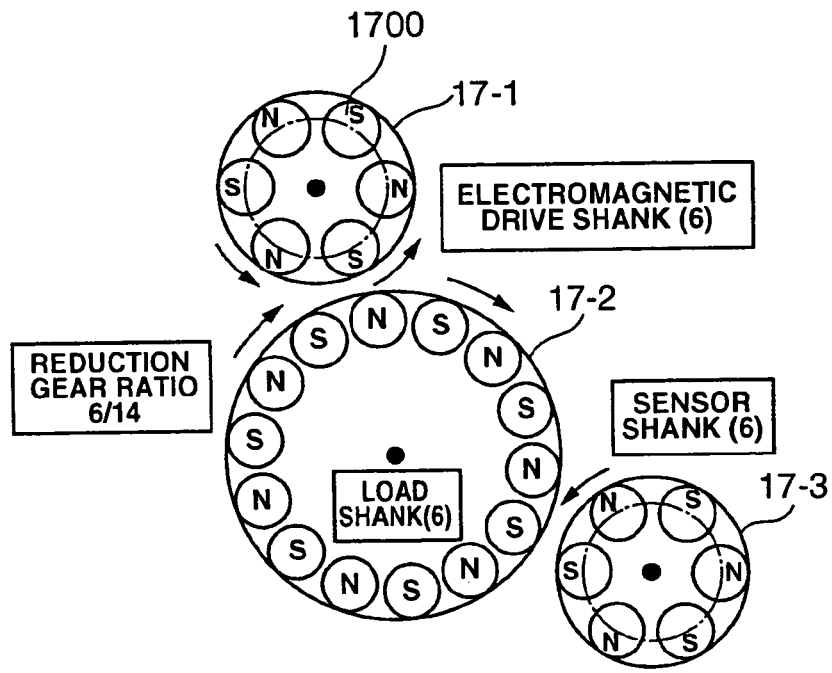
FIG. 18 is a modified example of FIG. 12.

FIG. 18 is a modified example of FIG. 12, and shows a functional block diagram of a transmission system comprising a deceleration function. Reference numeral 17-1 is an exciting drive-side magnetic rotor, 17-2 is a synchronous drive-side magnetic rotor (decelerator), and 17-3 is a synchronous drive-side magnetic rotor (subject of transmission). Reference numeral 1700 represents a permanent magnet inside the magnetic rotor. The number of permanent magnets of the magnetic rotor 17-1 (N: 6 for example) and the number of permanent magnets of the magnetic rotor 17-2 (M: 14 for example) decelerate the rotational speed of the magnetic rotor 17-1 by (N/M) times, and magnetic coupling is thereby transmitted to the magnetic rotor 17-3. In this embodiment, the rotational speed of the magnetic rotor 17-3 is detected with the A-phase sensor and B-phase sensor.

Figure 19:
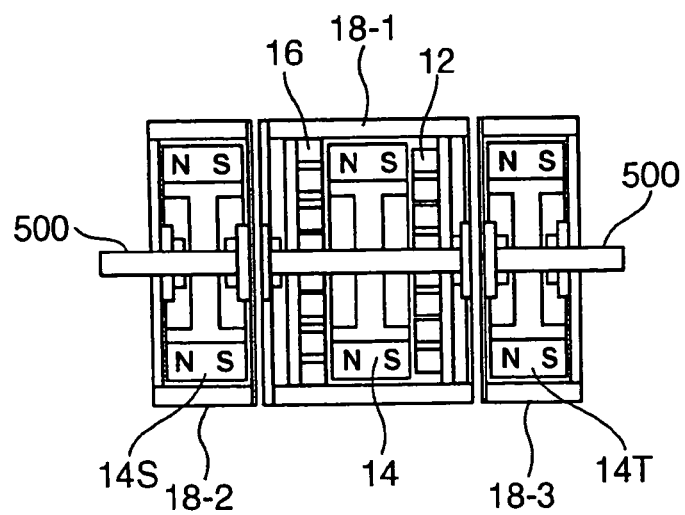
FIG. 19 is a modified example of FIG. 16.

FIG. 19 is a side view of another embodiment in which a plurality of motors is combined in the serial direction. In FIG. 19, reference numeral 18-1 is an excitation drive-side motor aligned in the center of three motors. Reference numerals 18-2 and 18-3 on both sides of the serial direction of this motor are the synchronous drive-side motors. The magnetic rotor 14 will rotate by energizing the coils 12, 16 of the motor 18-1. The magnetic rotors 14T, 14S of the synchronous drive-side motors will synchronously rotate by being magnetically coupled with changes in the magnetic field generated from this rotation. The axis 500 coupled with the magnetic rotor will rotate thereby, and the axial rotation torque is transmitted to the load. The A-phase sensor and B-phase sensor described above are provided to the synchronously driven magnetic rotors.

Figure 20:
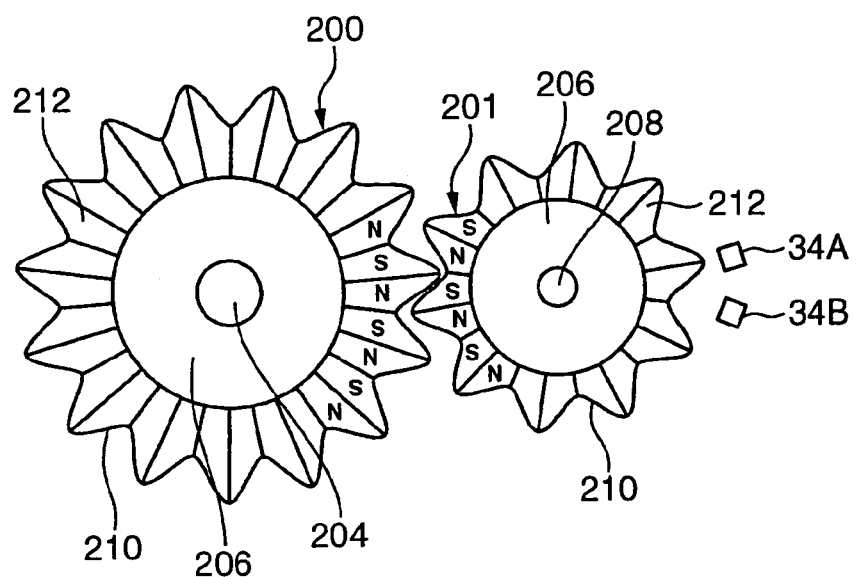
FIG. 20 is a plan view showing an arrangement example of the drive-side rotor (magnetic body) and the driven-side rotor (load side)

FIG. 20 is a modified example of FIG. 12. In this example, the shape of the rotor (magnetic body) is changed as illustrated in FIG. 20. In other words, the rotor is structured from a disk, which is a circular body, and a magnetic area is formed in the shape of teeth, in particular a sinusoidal wave curve, along the outer periphery of this disk. Reference numeral 200 is a drive-side rotor, and 210 is a driven-side (load-side) rotor. Reference numeral 210 represents a magnetic area, 204 is the rotational axis of the drive-side rotor, and 208 is the rotational axis of the driven-side rotor.

In this magnetic area, a plurality of magnetic pole elements (permanent magnets) 212 is aligned in order so as to alternately become opposite poles along the shape of a sinusoidal wave curve. The rotor is formed from a disk 206 of a nonmagnetic body, and the magnetic area is formed along the outer periphery of this disk. In particular, at the outer periphery of the rotor, a plurality of rectangular areas 212 facing the center of the rotor is defined, and rectangular permanent magnets are fixed at the outer periphery of the disk in this rectangular area. As a result of grinding the outer periphery of the disk, such outer periphery of the disk may be formed in a sinusoidal wave shape.

The magnetic area 210 of the drive-side rotor and the magnetic area 210 of the driven-side rotor 201 are disposed such that both rotors are adjacent to each other similar to the engagement of toothed gears. Nevertheless, the magnetic areas of both rotors face each other via a slight spacing without contacting each other. When the drive-side rotor is rotated, the direction of the magnetic field thereof will change, and the driven-side rotor will rotate upon being affected by such change.

Here, magnetic pole elements are respectively provided to the drive-side and driven-side such that the arrangement of the magnetic pole elements in the drive-side magnetic area and the arrangement of the magnetic pole elements in the driven-side magnetic area will be mutually attracted to each other.

In other words, at the coupling of the magnetic area 210 of the drive-side rotor 200 and the magnetic area 210 of the driven-side rotor 201 (coupling of the convex portion of the drive-side rotor and the concave portion of the driven-side rotor, or the concave portion of the drive-side rotor and the convex portion of the driven-side rotor), the N pole of the drive-side rotor and the S pole of the driven-side rotor are made to face each other at the nearest distance, or the S pole of the drive-side rotor and the N pole of the driven-side rotor are made to face each other at the nearest distance.

Therefore, when the drive-side rotor is rotated, a magnetic action will work such that the magnetic pole element of the drive-side rotor and the magnetic pole element of the driven-side rotor will be attracted to each other, and the driven-side rotor will rotate in synchronization with the rotation of the drive-side rotor. As described above, reference numeral 34A is a sensor for deciding the timing of supplying an excitation signal to the A-phase coil of the drive-side rotor, and 34B is a sensor for providing an excitation signal to the B-phase coil of the drive-side rotor. In this embodiment, these sensors are arranged at an angular difference of 30 degrees.

With the arrangement structure of the plurality of magnetic bodies explained in FIG. 20, when the magnetic areas of the drive-side rotor and driven-side rotor approach and the drive-side rotor rotates thereby, the magnetic fields generated in the respective magnetic areas will interfere with each other, and magnetic transmission between these rotors can be realized as a result thereof. In other words, attraction between the magnetic area of the drive-side rotor and the magnetic area of the driven-side rotor sequentially progresses in accordance with the rotation of the drive-side rotor, and the generation of rotational torque around the axis 208 of the driven-side rotor will cause the driven-side rotor to rotate. Here, since the magnetic area of the rotor surface is formed from a sinusoidal wave curve, the magnetic poles in the magnetic areas of adjacent rotors may be centralized. Thus, magnetic transmission can be achieved with high efficiency.

Figure 21:
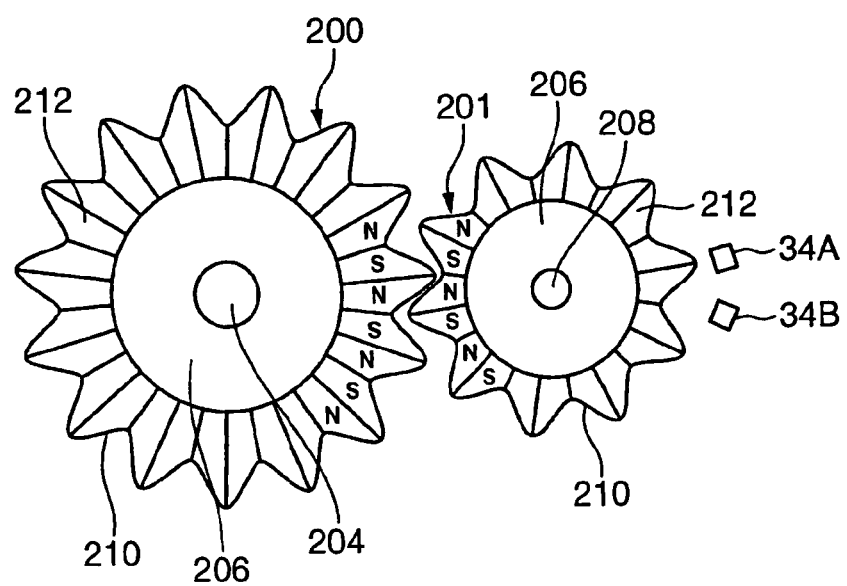
FIG. 21 is a plan view pertaining to a modified example thereof.

FIG. 21 is a diagram showing yet another embodiment, and this differs from the embodiment illustrated in FIG. 20 with respect to the arrangement of the magnetic pole elements in the magnetic pole areas of adjacent rotors. In this embodiment, the magnetic pole elements are arranged in relation to the magnetic areas 210 of the respective rotors such that the directions of the magnetic poles will repel against each other in the coupling area between the magnetic areas of both rotors. In other words, the N pole of the drive-side rotor and the N pole of the driven-side rotor, or the S pole of the drive-side rotor and the S pole of the driven-side rotor will face each other and generate a repulsive force between the magnetic pole elements of the rotors.

Here, when the drive-side rotor 200 rotates, the magnetic field change arising along the periphery of the drive-side rotor 200 will act on the magnetic field arising along the periphery of the driven-side rotor 201 so as to generate a repulsive force. When the drive-side rotor 200 rotates, the magnetic field will change, repulsive force will be generated along the peripheral direction of the driven-side rotor 201 pursuant to such a change, and the generated torque will cause the driven-side rotor to rotate around the axis 208.

Figure 22:
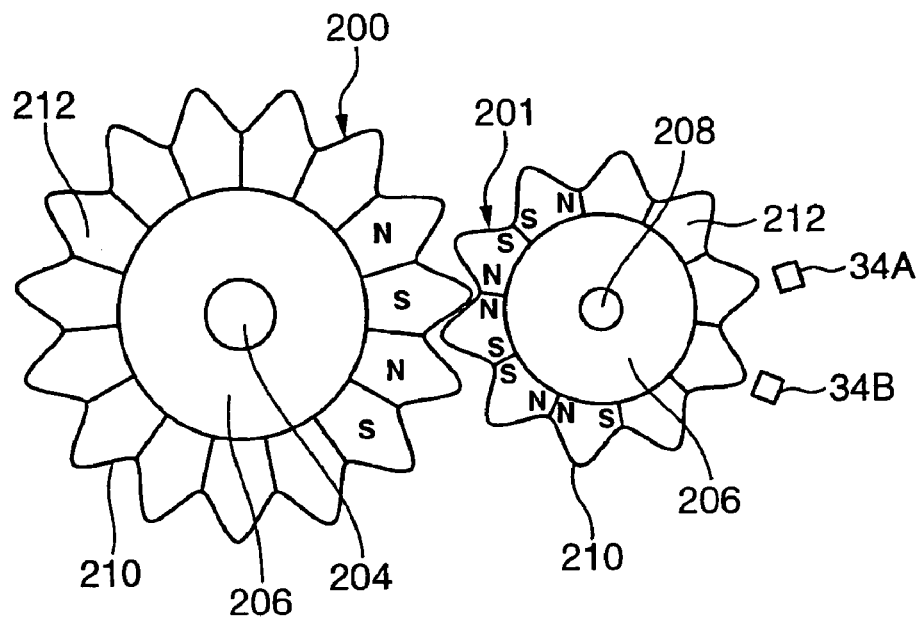
FIG. 22 is a plan view pertaining to a further modified example thereof.
Figure 23:
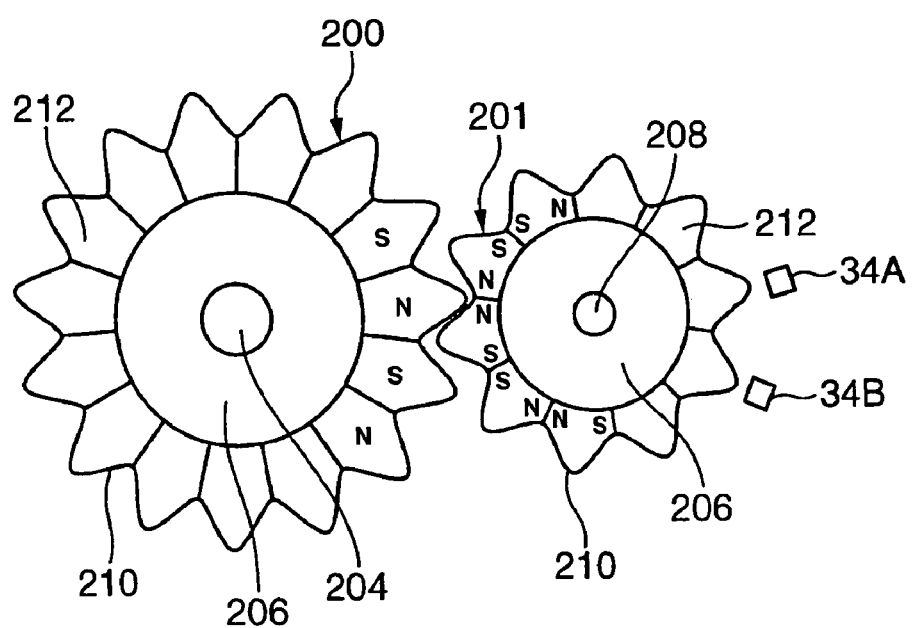
FIG. 23 is a plan view pertaining to a further modified example thereof.

FIG. 22 is a diagram showing yet another embodiment, and this differs from the embodiment illustrated in FIG. 21 with respect to the array pitch of the magnetic pole elements. In other words, with the embodiment of FIG. 20, since the line of the magnetic area forms a sinusoidal wave, the shape is similar to an arrangement of a plurality of teeth; like a gear, and a single tooth of the magnetic area of the drive-side rotor is formed from a pair of N and S. With the embodiment shown in FIG. 22, however, a single tooth of the magnetic area of the drive-side rotor is formed from either an N or S pole. In this embodiment also, the drive of the drive-side rotor is transmitted to the driven-side rotor by utilizing the magnetic repulsive force between the magnetic area of the drive-side rotor and the [magnetic area of the] driven-side rotor. The embodiment depicted in FIG. 23 is a modified example of FIG. 22, and the arrangement of the magnetic pole elements in the adjacent magnetic areas is defined such that a repulsive force will work between the adjacent magnetic rotors.

Figure 24:
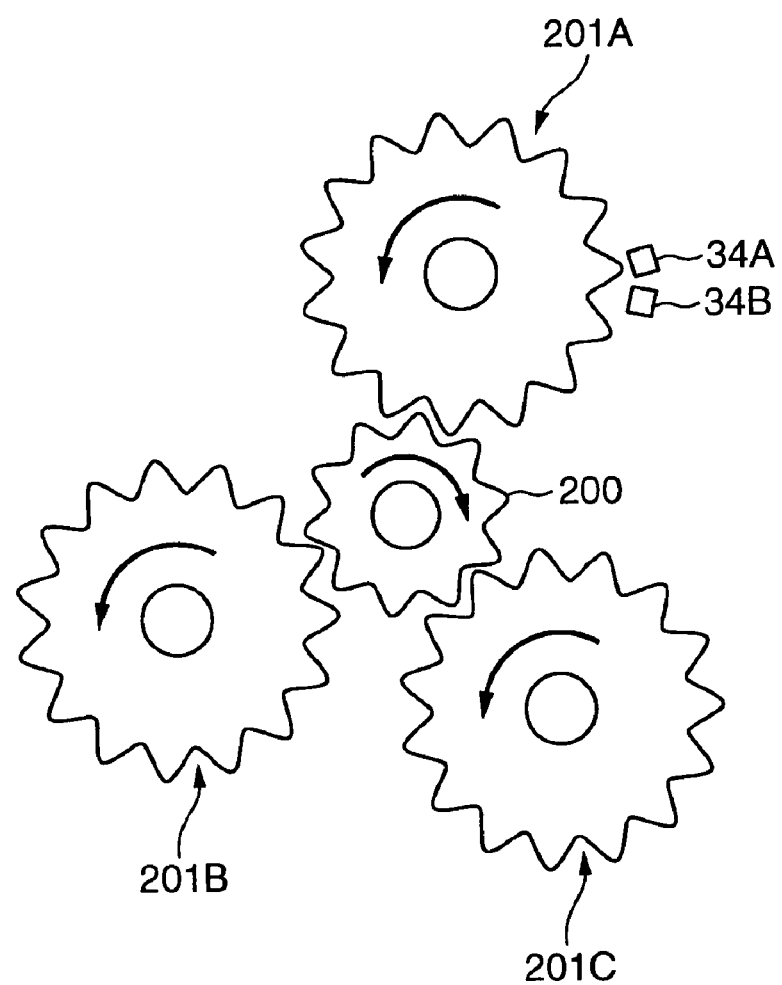
FIG. 24 is a plan view showing an arrangement example in which a plurality of driven-side rotors is connected to the drive side-rotor.

As shown in FIG. 24, by connecting a plurality of driven-side rotors 201A to 201C to the drive-side rotor 200, a multiple magnetic transmission system can be created. Incidentally, the arrows in the diagram represent the rotational direction of the rotor.

Further, in the embodiments described with reference to FIG. 12 and FIGS. 20 to 24, although the elements constituting the magnetic transmission system were structured from the motor illustrated in FIG. 8, irrespective of such a motor, the magnetic pole elements may be structured with the permanent magnets in the shape of the rotors depicted in the diagrams. For instance, the drive-side rotor may be directly connected to the rotational axis of the motor, and the drive of the drive-side rotor may be magnetically transmitted to the driven-side rotor. Further, the sensor may also be a magnetic sensor employing a hole effect.

Figure 25:
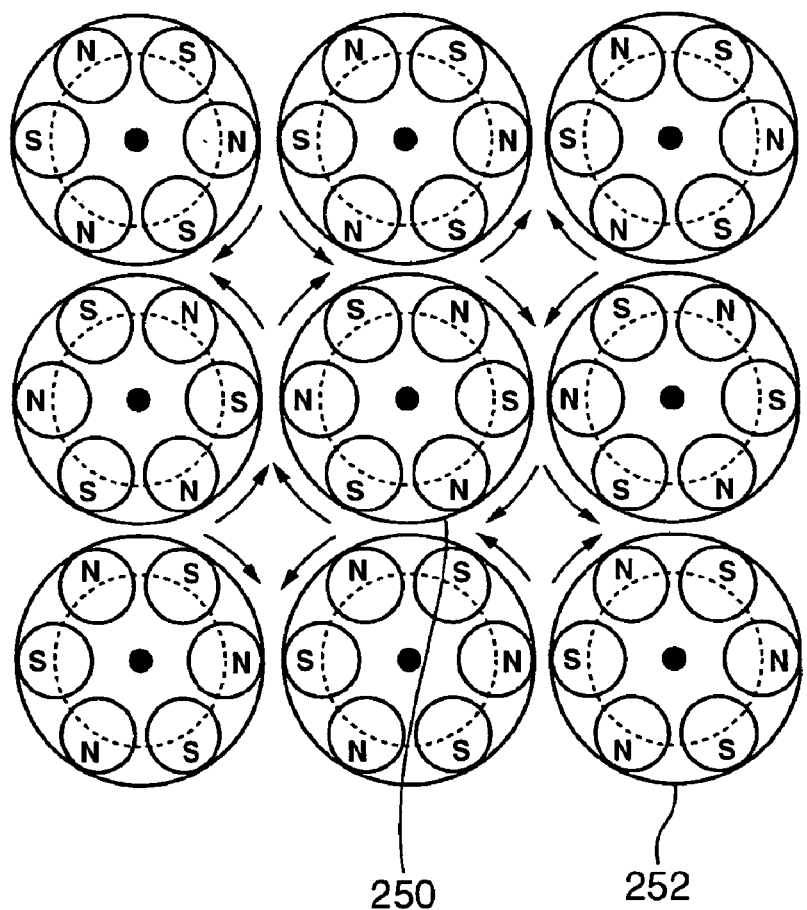
FIG. 25 is a diagram showing an arrangement example of a plurality of magnetic bodies pertaining to the second embodiment of the present invention.

FIG. 25 is a diagram pertaining to yet another embodiment of the present invention, and the magnetic body 250 in the center is a rotor in which a plurality of permanent magnets is alternately aligned, and is rotated by being connected to a rotation drive source not shown. The magnetic bodies 252 around this magnetic body are, as shown in FIG. 8, motors explained as a driven-side motor in the previous embodiments in which a plurality of electromagnetic coils is arranged as stators to the movable bodies in a non-contact manner in relation to the movable bodies to which a plurality of permanent magnets is sequentially arranged, and an exciting current is supplied to the electromagnetic coils so as cause the locomotion of the movable bodies through the attraction-repulsion between the movable bodies and electromagnetic coils.

Figure 26:
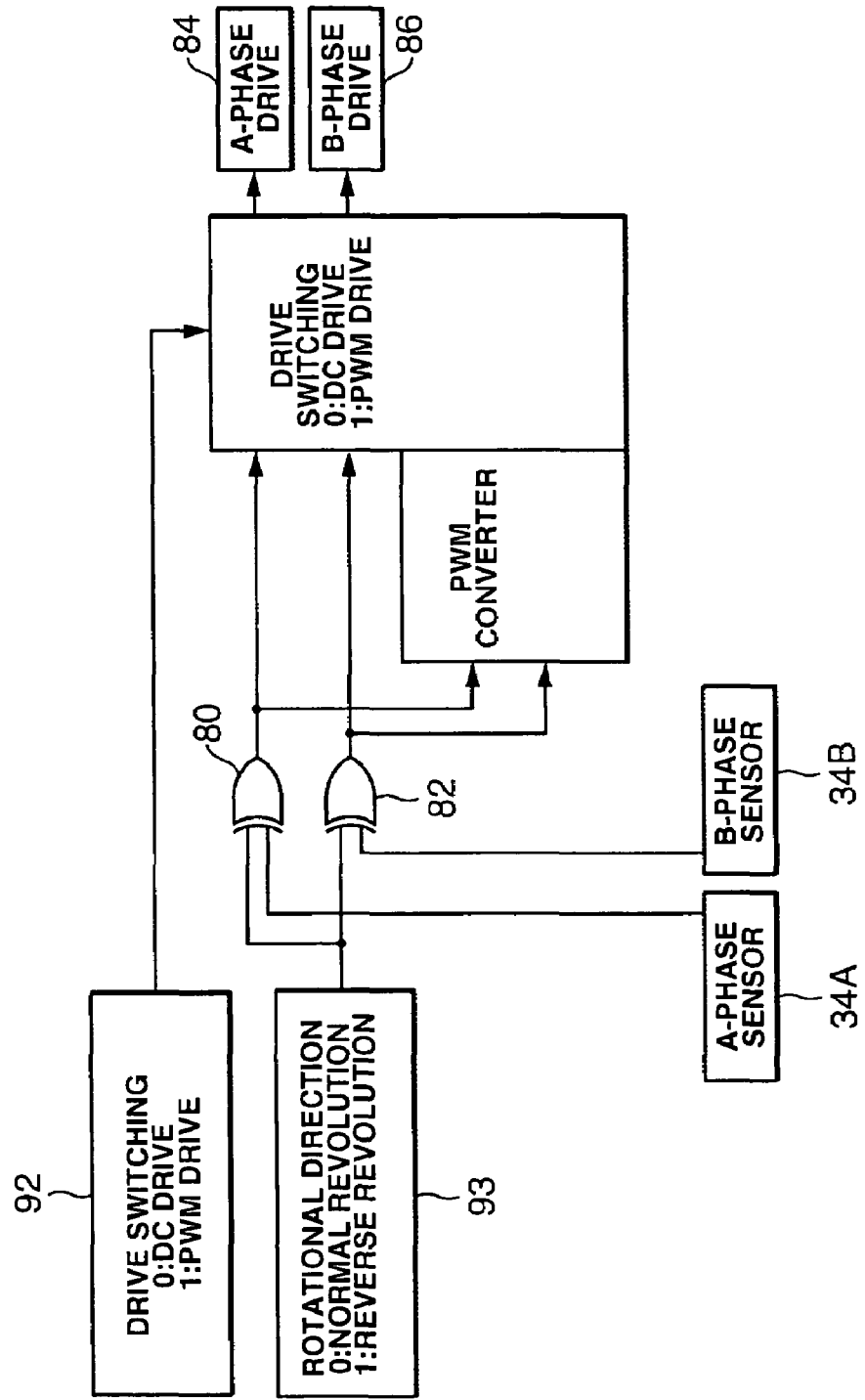
FIG. 26 is a control circuit block diagram for directly returning the digital output of the sensor to the coil drive circuit.

FIG. 26 is a diagram of the processing circuit of the control signal supplied to the A-phase drive circuit 84 and B-phase drive circuit 86 of other magnetic bodies. The digital output from the A-phase sensor 35A is supplied to the EX-NOR gate 80, and the digital output from the B-phase sensor 35B is supplied to the EX-NOR circuit 82. Reference numeral 92 is a control signal forming means for selecting whether to supply the output from the sensor to the drive circuit as is, or to change (PWM) the duty of the sensor output value. Reference numeral 93 is a control signal forming means for determining whether to make the rotational direction of the rotor formed from permanent magnets a normal rotation or a reverse rotation. When making either pattern (polarity) of the A-phase coil and B-phase coil a normal rotation or a reverse rotation, this may be made the opposite. These respective means are realized with a microcomputer. Reference numeral 88 is a PWM converter and, when the sensor output is analog, is capable of controlling the torque of the motor by converting (current controlling) the analog quantity from the (hole element) into a logic quantity via PWM control. Reference numeral 90 is a switching circuit for selecting a signal formed with the PWM converter 88 or a signal directly obtained from the sensor, and switching the supply to the A-phase drive 84 or B-phase drive 86.

As the sensor, for example, a hole element may be used. This hole element is for detecting changes in the magnetic field, and makes an analog output (sinusoidal wave) or a digital output. According to this embodiment, the magnetic body (first magnetic body) in the center is coupled with the drive source, and the sensor output of the peripherally adjacent driver (second magnetic body) is used as the excitation signal of the second magnetic body. Thus, when commencing the drive of the second magnetic body (requiring a high torque), the second magnetic body may be driven with a weak current (microampere level).

The entire disclosures of Japanese Patent Application Nos. 2004-076410 filed Mar. 17, 2004, 2003-404842 filed Dec. 3, 2003 and 2003-175454 filed Jun. 19, 2003 are hereby incorporated by reference.

What is claimed is:

1. A drive control system formed from a mechanism which arranges a plurality of magnetic bodies, and, when at least one magnetic body is driven, the drive thereof is sequentially transmitted to the other magnetic bodies without using a mechanical transmission mechanism; wherein the magnetic field generated from the drive of at least one magnetic body is magnetically coupled with the other magnetic bodies so as to synchronously drive said other magnetic bodies, the system comprising a drive control unit formed from a plurality of motors mutually arranged adjacently, wherewith said motors are structured by said magnetic bodies comprising a magnetic rotor, and which is for exciting and driving at least one of said motors; wherein said drive control unit is constituted so as to send a drive signal for driving said magnetic rotor to at least one of said motors; and the magnetic rotors of the other motors are synchronously driven by the magnetic coupling with the magnetic field generated from the excitation driven magnetic rotor.

2. A system according to claim 1, wherein a load is coupled with said synchronously driven magnetic bodies.

3. A system according to claim 1, wherein a load is coupled with a magnetic rotor of at least one of said motors.

4. A system according to claim 1, wherein said plurality of motors is mutually juxtaposed in a two-dimensional direction.

5. A system according to claim 1, wherein said motor is of a structure comprising a first magnetic body and a second magnetic body, and a third magnetic body arranged between said first and second magnetic bodies and relatively movable in a prescribed direction in relation to said first and second magnetic bodies; said first magnetic body and second magnetic body respectively have a structure in which a plurality of electromagnetic coils is capable of alternately exciting opposite poles; said third magnetic body has a structure in which permanent magnets are alternately magnetized to opposite poles and sequentially arranged; and said first magnetic body and said second magnetic body have a structure in which the electromagnetic coil of said first magnetic body and the electromagnetic coil of said second magnetic body are arranged to mutually have an array pitch difference.

6. A system according to claim 1, wherein said magnetic body forms a phase in which a plurality of N sets, wherewith two exciting coils of an N/S side and S/N side form a set, is arranged in even intervals; at least two of said phases are provided in an arrangement where an angular difference is provided to the exciting coil arrangement of the respective phases; and the respective phases are made to face each other while other magnetic bodies are provided there between.

7. A system according to claim 6, wherein the other magnetic bodies are permanent magnets alternately magnetized to opposite poles.

8. A system according to claim 6, wherein all exciting coils are excited to be constantly driven against the two-phase exciting coil during the rotation ($2\pi$) of the rotor formed from said magnetic body.

9. A system according to claim 1, wherein a desired magnetic body may be used for either the drive side or transmission side.

10. A system according to claim 1, wherein provided is a sensor for detecting the change in intensity of the magnetic field of said driving magnetic bodies, and the output of said sensor is directly supplied as an exciting current to the magnetic coil of said other magnetic bodies.

11. A system according to claim 10, wherein, with said other magnetic bodies, a plurality of electromagnetic coils is arranged as stators to said movable bodies in a non-contact manner in relation to the movable bodies to which a plurality of permanent magnets is sequentially arranged, and an exciting current is supplied to said electromagnetic coils so as cause the locomotion of said movable bodies through the attraction-repulsion between said movable bodies and electromagnetic coils.

12. A system according to claim 1 or claim 3, wherein said drive control circuit comprises a rotational position sensor of said synchronously driven magnetic rotor and returns the detection signal from said rotational position sensor to said drive control circuit; and said drive control circuit controls said excitation driven magnetic rotor in accordance with the state of said synchronously driven magnetic rotor.

13. A system according to claim 12, wherein said drive control circuit PLL controls the drive of said excitation driven motor in accordance with the driven state of said synchronously driven magnetic rotor.

14. A system according to claim 12, wherein said drive control circuit PWM controls the drive of said excitation driven motor in accordance with the driven state of said synchronously driven rotor.

15. A system according to claim 14, wherein said sensor is provided to a synchronously driven magnetic rotor with which the greatest load is coupled.

16. A system according to claim 1 or claim 4, wherein said plurality of motors is mutually overlapped and arranged in a prescribed direction.

17. A system according to claim 10 or claim 11, wherein said driving magnetic bodies are movable bodies formed by being connected to a drive source and to which a plurality of permanent magnets alternately magnetized to opposite poles is sequentially arranged.

18. A system according to claim 17, wherein PWM control based on the drive request torque against other magnet bodies is added to said sensor output value, and said control signal is supplied to said exciting coils.

19. A system according to any one of claims 10 to 11, wherein PWM control based on the drive request torque against other magnetic bodies is added to said sensor output value, and said control signal is supplied to said exciting coils.

20. An array structure of a plurality of magnetic bodies formed from a mechanism which arranges a plurality of magnetic bodies, and, when at least one magnetic body is driven, the drive thereof is sequentially transmitted to the other magnetic bodies without using a mechanical transmission mechanism, and the magnetic field generated from the drive of at least one magnetic body is magnetically coupled with the other magnetic bodies so as to synchronously drive said other magnetic bodies; wherein said magnetic bodies are formed from circular bodies, a plurality of magnetic pole elements alternately magnetized to opposite poles along the periphery of said circular bodies is formed in a tooth shape, and the teeth of adjacent magnetic bodies are provided via slight spacing such that said teeth do not contact each other, the array structure comprising a drive control unit formed from a plurality of motors mutually arranged adjacently, wherewith said motors are structured by said magnetic bodies comprising a magnetic rotor, and which is for exciting and driving at least one of said motors; wherein said drive control unit is constituted so as to send a drive signal for driving said magnetic rotor to at least one of said motors; and the magnetic rotors of the other motors are synchronously driven by the magnetic coupling with the magnetic field generated from the excitation driven magnetic rotor.

21. A structure according to claim 20 wherein said teeth are formed in the shape of a sinusoidal curve.

22. A structure according to claim 20, wherein said magnetic pole elements are structured from permanent magnets.

23. A structure according to claim 20 wherein said magnetic pole elements are arranged in said magnetic bodies such that the magnetic couplings between said teeth of the adjacent magnetic bodies repel against each other.

24. A structure according to claim 20, wherein said magnetic pole elements are arranged in said magnetic bodies such that the magnetic couplings between said teeth of the adjacent magnetic bodies are attracted to each other.

25. A structure according to claim 20, wherein the direction of the magnetic poles of said magnetic bodies is formed along the periphery of said magnetic bodies.

26. At least one magnetic body according to claim 20.

27. A magnetic transmission system having a combination of a driver and load formed from a system to which a plurality of magnetic bodies is arranged, wherein a non-contact motion transmission is performed with magnetic coupling between at least one of said drivers and one of said loads, position detection means of magnetic bodies is provided to said load, and an electromagnetic coil for exciting said driver based on the detection results thereof is further provided, the system comprising a drive control unit formed from a plurality of motors mutually arranged adjacently, wherewith said motors are structured by said magnetic bodies comprising a magnetic rotor, and which is for exciting and driving at least one of said motors; wherein said drive control unit is constituted so as to send a drive signal for driving said magnetic rotor to at least one of said motors; and the magnetic rotors of the other motors are synchronously driven by the magnetic coupling with the magnetic field generated from the excitation driven magnetic rotor.

* * * * *

UNITED STATES PATENT AND TRADEMARK OFFICE
CERTIFICATE OF CORRECTION

PATENT NO. : 6,982,530 B2
APPLICATION NO. : 10/861236
DATED : January 3, 2006
INVENTOR(S) : Kesatoshi Takeuchi It is certified that error appears in the above-identified patent and that said Letters Patent is hereby corrected as shown below:

| | |
|---|---|
| Column 2, Line 21: | After "as" insert --to-- |
| Column 8, Line 6: | "form" should be --from-- |
| Column 8, Line 51: | Delete "(350 in FIG. 30)" |
| Column 8, Line 53: | Delete "the" |
| Column 13, Line 32: | After "as" insert --to-- |
| Column 15, Line 46: | "magnet" should read --magnetic-- |

Signed and Sealed this

Twenty-sixth Day of December, 2006

JON W. DUDAS
*Director of the United States Patent and Trademark Office*